June 9, 1953  G. F. WIKLE ET AL  2,641,021
MACHINE FOR HEAT-TREATING TIRES
Filed Feb. 2, 1951  13 Sheets-Sheet 1

INVENTOR.
GEORGE F. WIKLE
CHARLES E. TODD
BY
Henry P. Truesdell
ATTORNEY

June 9, 1953    G. F. WIKLE ET AL    2,641,021
MACHINE FOR HEAT-TREATING TIRES
Filed Feb. 2, 1951    13 Sheets-Sheet 2

INVENTOR.
GEORGE F. WIKLE
CHARLES E. TODD
BY Henry P. Truesdell
ATTORNEY

June 9, 1953 G. F. WIKLE ET AL 2,641,021
MACHINE FOR HEAT-TREATING TIRES
Filed Feb. 2, 1951 13 Sheets-Sheet 3

INVENTOR.
GEORGE F. WIKLE
CHARLES E. TODD
BY
Henry P. Truesdell
ATTORNEY

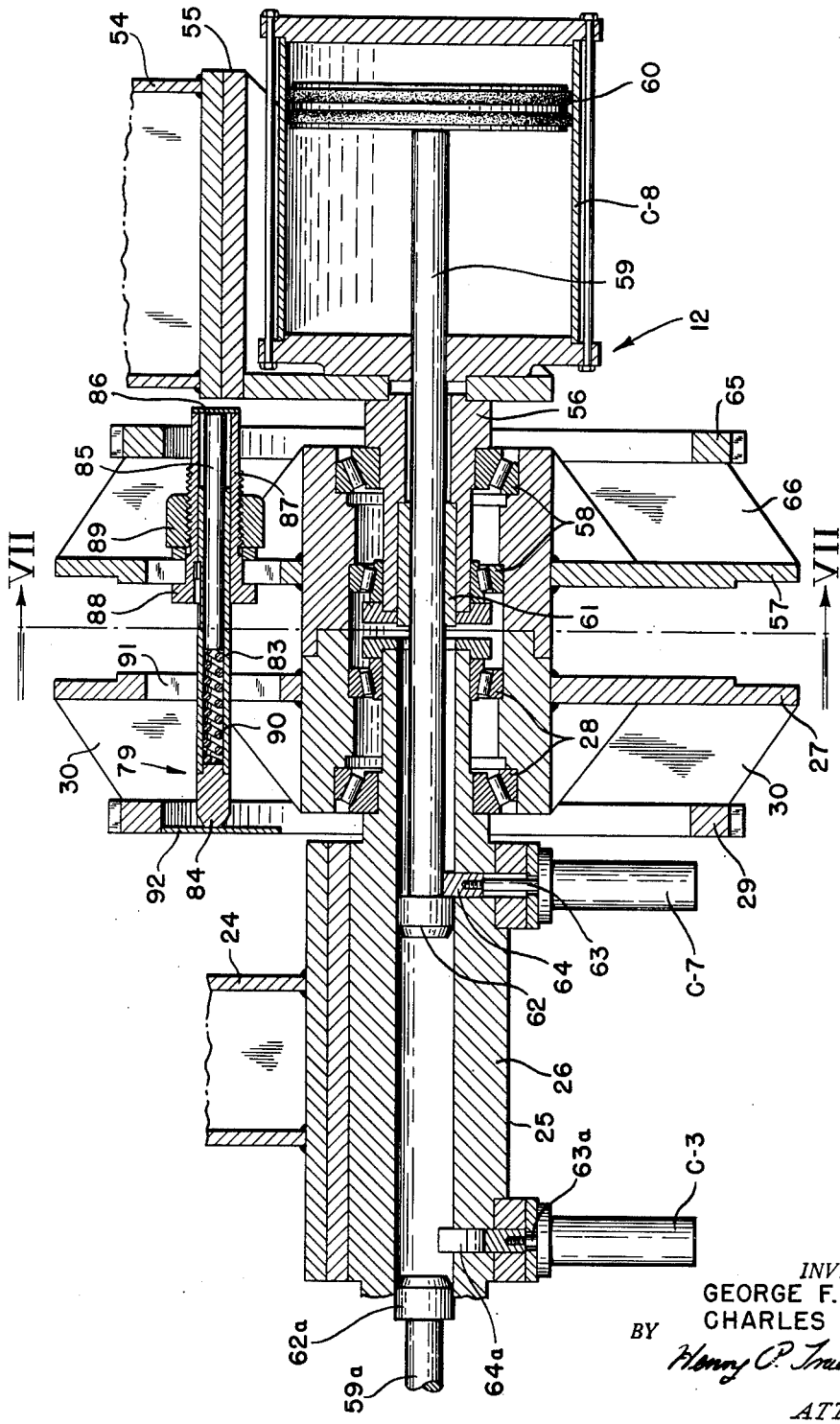

June 9, 1953
G. F. WIKLE ET AL
2,641,021
MACHINE FOR HEAT-TREATING TIRES
Filed Feb. 2, 1951
13 Sheets-Sheet 5
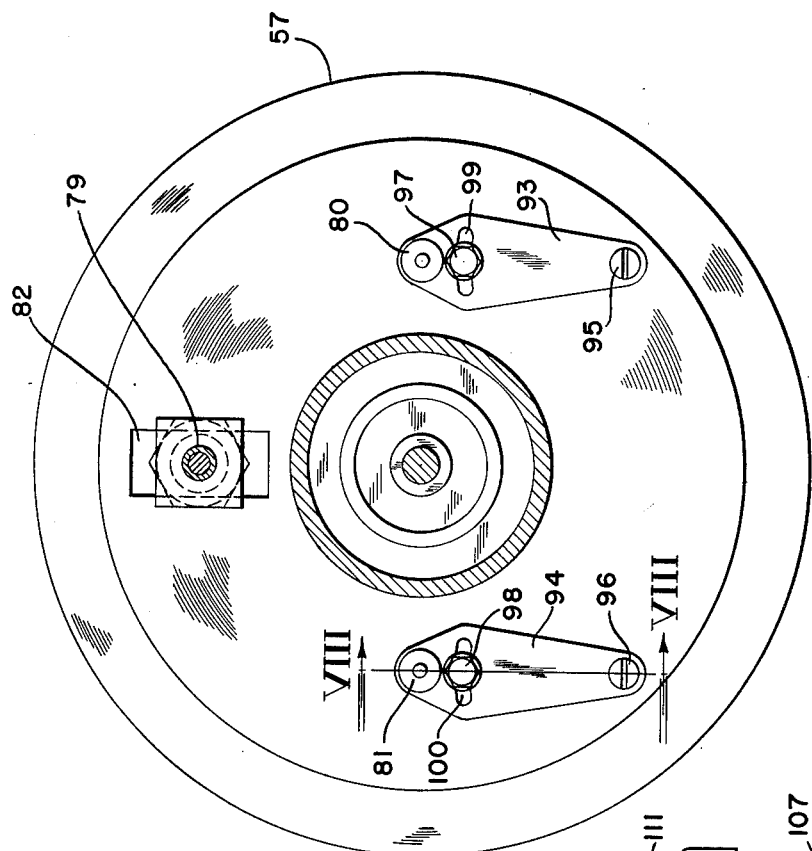
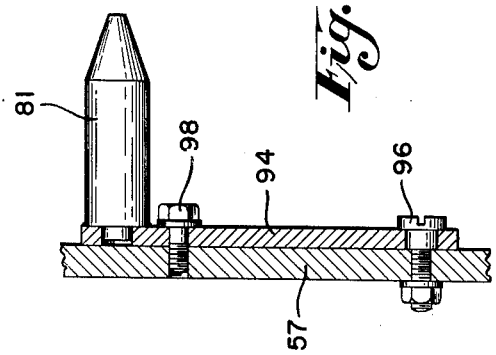
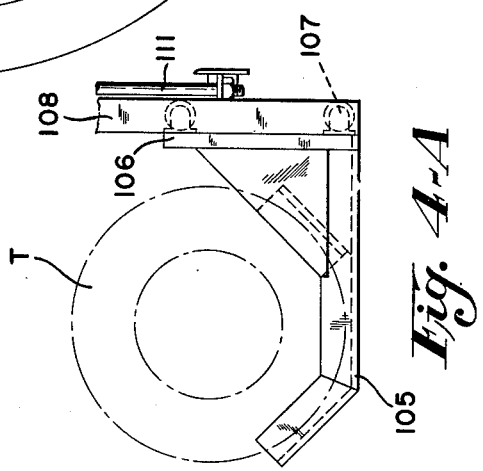
INVENTOR.
GEORGE F. WIKLE
CHARLES E. TODD
BY
Henry P. Truesdell
ATTORNEY

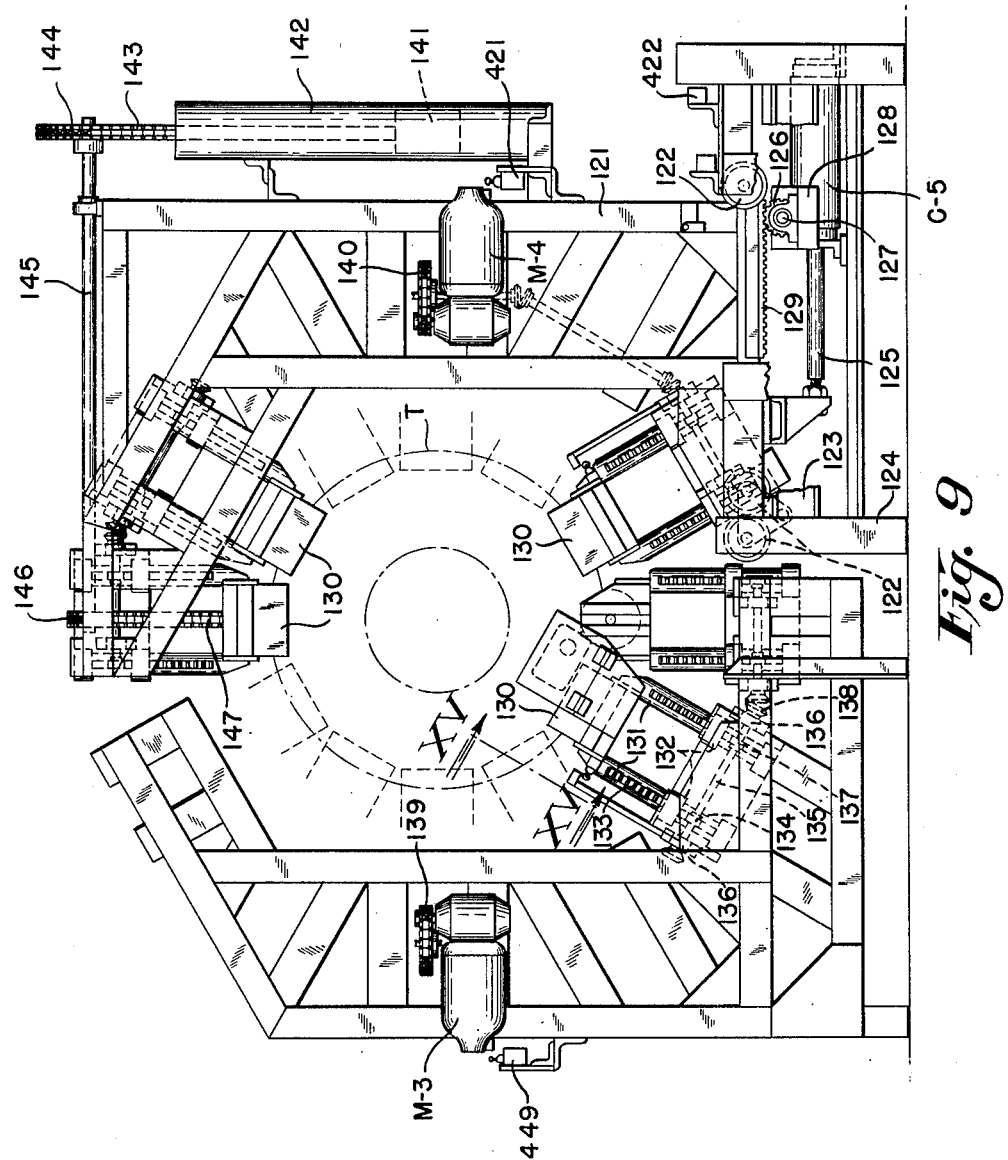

June 9, 1953 G. F. WIKLE ET AL 2,641,021
MACHINE FOR HEAT-TREATING TIRES
Filed Feb. 2, 1951 13 Sheets-Sheet 7

INVENTOR.
GEORGE F. WIKLE
CHARLES E. TODD
BY Henry P. Truesdell
ATTORNEY

June 9, 1953  G. F. WIKLE ET AL  2,641,021
MACHINE FOR HEAT-TREATING TIRES
Filed Feb. 2, 1951  13 Sheets-Sheet 8

INVENTOR.
GEORGE F. WIKLE
CHARLES F. TODD
BY Henry P. Truesdell
ATTORNEY

June 9, 1953        G. F. WIKLE ET AL        2,641,021
MACHINE FOR HEAT-TREATING TIRES
Filed Feb. 2, 1951        13 Sheets-Sheet 9
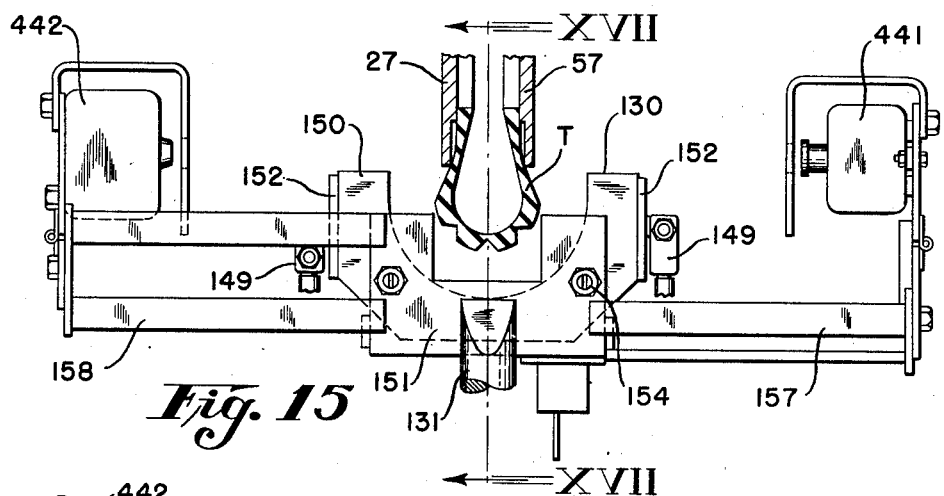
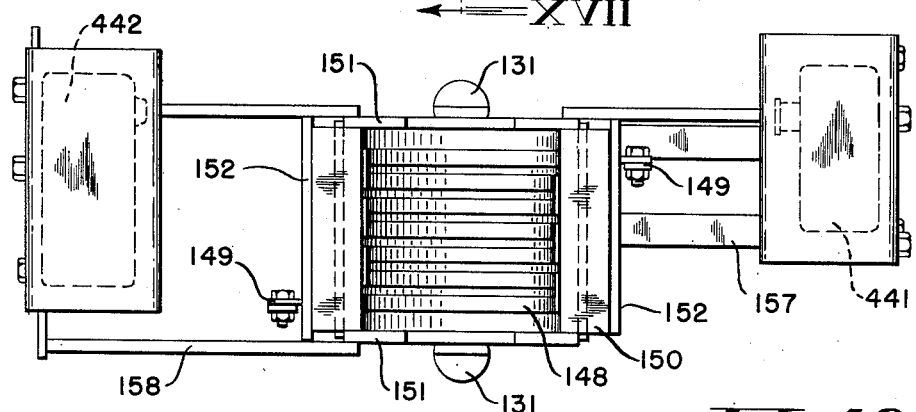
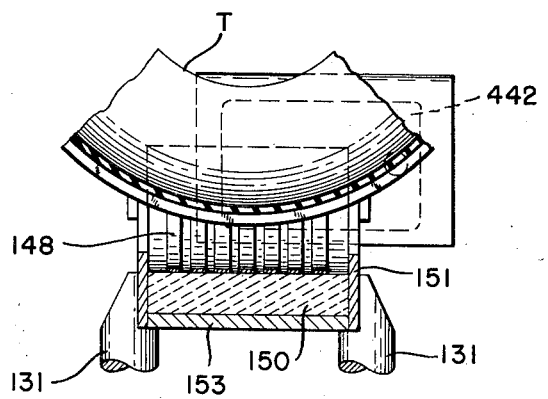
*INVENTOR.*
GEORGE F. WIKLE
BY CHARLES E. TODD
*ATTORNEY*

June 9, 1953     G. F. WIKLE ET AL     2,641,021
MACHINE FOR HEAT-TREATING TIRES
Filed Feb. 2, 1951     13 Sheets-Sheet 11

INVENTOR.
GEORGE F. WIKLE
CHARLES E. TODD
BY Henry P. Truesdell
ATTORNEY

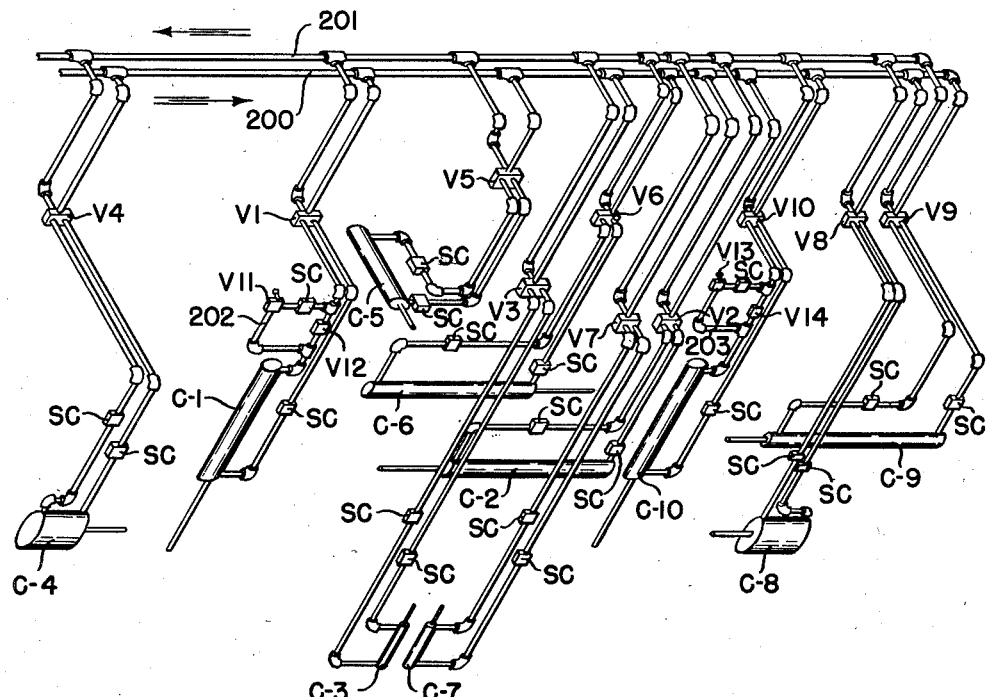
Fig. 21
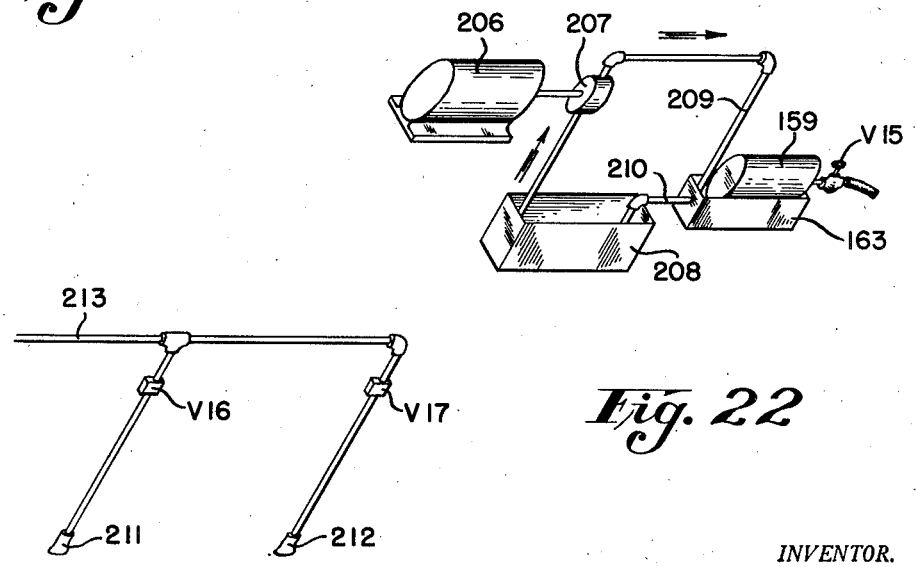
Fig. 22
Fig. 23

Patented June 9, 1953

2,641,021

UNITED STATES PATENT OFFICE 2,641,021

MACHINE FOR HEAT-TREATING TIRES

George F. Wikle and Charles E. Todd, Detroit, Mich., assignors to United States Rubber Company, New York, N. Y., a corporation of New Jersey Application February 2, 1951, Serial No. 209,092

23 Claims. (Cl. 18—2)

This invention relates to a machine for treating tires and more particularly to a machine for heat treating the bases of the tread grooves of pneumatic tires to prevent cracking thereof. From one viewpoint, the apparatus of this invention is designed to efficiently treat tires accurately and uniformly according to the method disclosed in United States Patent No. 2,546,085 issued to William F. R. Briscoe and Robert E. Plummer and United States Patent No. 2,565,063 issued to William F. R. Briscoe and Verne H. Berry, both assigned to the same assignee as the instant application.

It is an object of this invention to provide a machine that will quickly and uniformly treat the bottoms of the tread grooves without adversely affecting the tread surface.

It is another object of the invention to provide a machine for heat treating tires which will prepare one tire for treatment while another tire is being treated.

A further object of the invention is to provide a machine for heat treating tires which includes heating means which are adjustable to heat the tread grooves of tires of various sizes.

A further object of the invention is to provide a machine for heat treating tires which has an applicator roller for applying a protective coating of liquid to the tread of the tire during the heating thereof, which roller is adjustable for tires having various tread widths.

According to the invention, the machine includes, a main tire carriage alternately movable between a first loading station and a second loading station, means at each loading station for moving a tire into alignment with either end of the carriage, and means at each end of the carriage for laterally squeezing the tire to distort the tread thereof and to clamp it to the end of the carriage. Heating means are provided at a point intermediate of the two loading stations and surrounding the path of movement of the carriage to heat the tread of a tire clamped to either end of the carriage. An applicator roller is provided at the heating means to apply a protective coating to the tread of the tire during the heating thereof and cooling means are provided at each loading station to cool the tread after heating thereof. The main carriage is of such a length that when one end is at the heating means, the other end will be at one of the loading stations so that a tire clamped to the end of the carriage at the loading station may be cooled, unloaded and replaced by a second tire, while a third tire clamped to the other end of the carriage is being heated.

Other objects and advantages of the present invention will become apparent from the following description when read in conjunction with the accompanying drawings wherein;

Fig. 4a is a view taken on the line IVa—IVa of Fig. 1 showing part of the tire lifting mechanism;

Fig. 6 is a partial sectional view showing the details of the main tire carriage and one of the clamping means;

Fig. 7 is a sectional view taken on the line VII—VII of Fig. 6 showing the details of the clamping plate;

Fig. 8 is a sectional view taken on the line VIII—VIII of Fig. 7 showing the details of one of the centering pins;

Fig. 9 is a side elevational view of the heating means showing the heating units in an extended position;

Fig. 15 is an elevational view showing the details of one of the heating units of the heating means of Figs. 9 and 10;

Fig. 16 is a top plan view showing the details of one of the heating units of the heating means of Figs. 9 and 10;

Fig. 17 is a sectional view taken on the line XVII—XVII of Fig. 15 showing the details of one of the heating units;

Fig. 21 is a diagram of the fluid pressure system including the fluid motors for the machine;

Fig. 22 is a diagrammatic view of the circulating system for the protective liquid applicator roller; and Fig. 23 is a diagram of the water system for cooling the tire after heating thereof.

Figure 1:
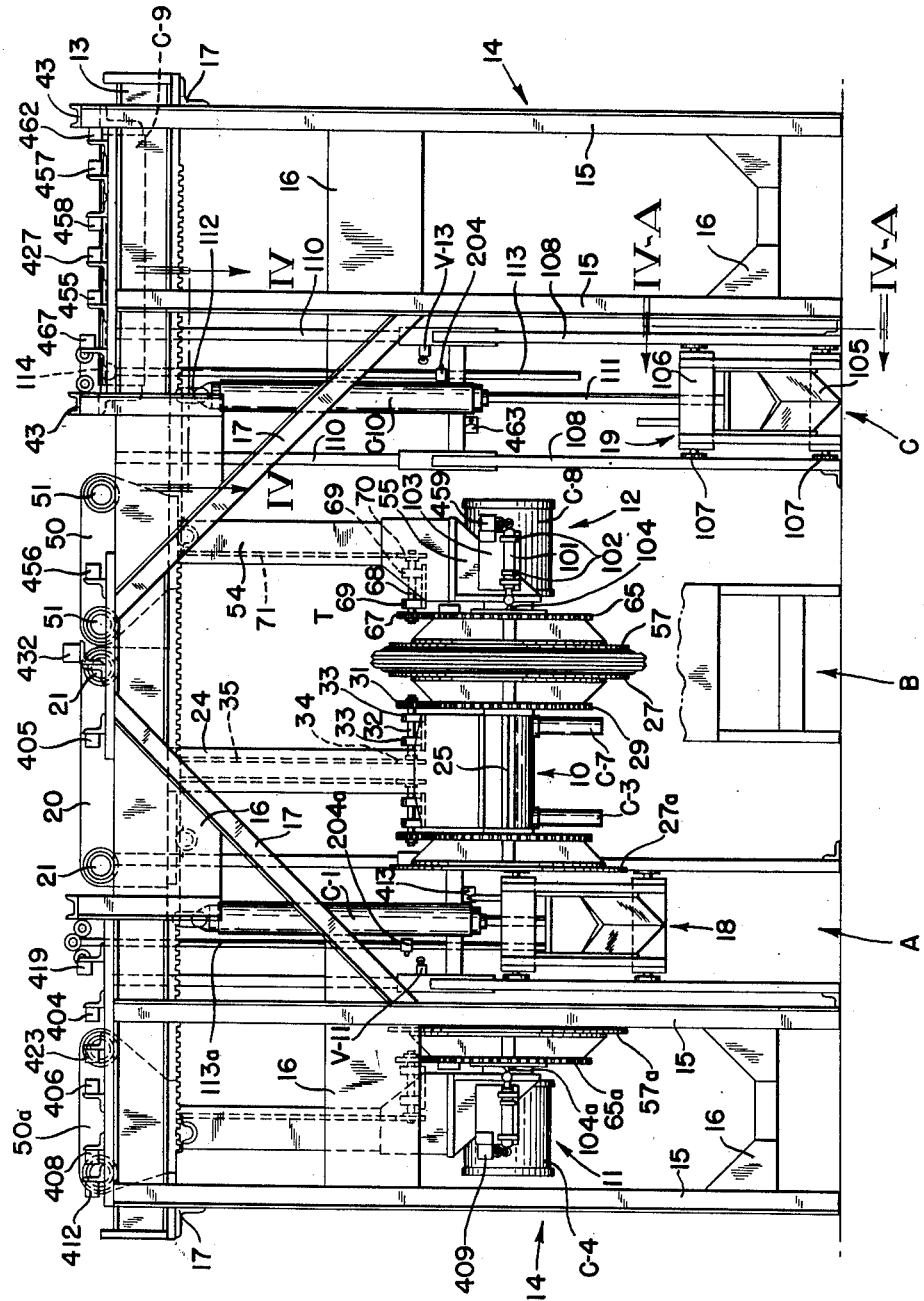
Fig. 1 is a front elevational view of the machine of the invention showing a tire in clamped position.

Referring to the drawings, and in particular to Fig. 1 of the drawings, the machine of the invention is disclosed as having three distinct operating stations, namely, a tire loading station A, a tire heating station B, and a tire loading station C. A main tire carriage 10 is movable back and forth between the loading station A and the loading station C. Fig. 1 discloses the carriage in its extreme left position. In this position, the left hand end of the carriage is at the loading station A and the right hand end of the carriage is at the heating station B.

A clamping mechanism 11 for simultaneously laterally squeezing a tire casing to distort its tread and for clamping it to the left hand end of the carriage 10 is shown in Fig. 1 in its non-clamping position. A similar clamping mechanism 12 for the right hand end of the carriage is shown in clamped position as laterally squeezing and clamping a tire T to the right hand end of the carriage 10. This arrangement allows one tire to be removed from one end of the carriage and replaced by a second tire while a third tire is being heated at the heating station B. Only a small portion of the heating means at the heating station B is shown in Fig. 1 to indicate its position relative to the other structure of the machine. The details of the heating means are disclosed in Figs. 9 and 10 and will be described hereinafter. The heating means surrounds the path of movement of the carriage 10 so that the carriage carries the squeezed tire into the heating field.

Figure 5:
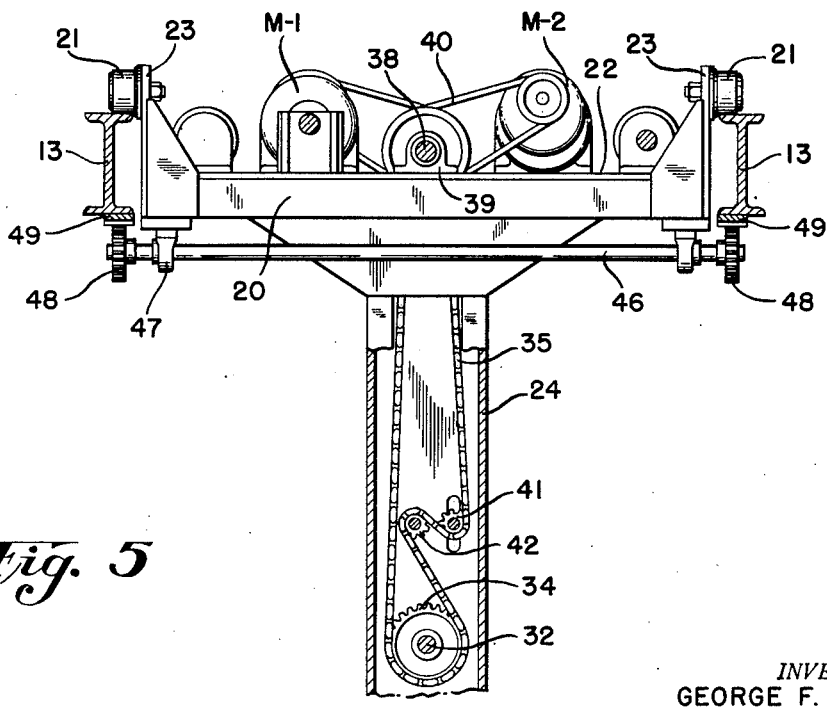
Fig. 5 is a sectional view taken on the line V—V of Fig. 2 showing part of the travelling mechanism for the main tire carriage.

The main carriage 10 and the clamping mechanisms 11 and 12 are supported from and mounted for linear movement along a pair of parallel over-head tracks 13 (Figs. 1 and 5). The tracks 13 are supported at each end by an open framework 14 made up of vertical structural members 15 suitably braced by plates 16 and angle sections 17. The open structure of the framework 14 allows the clamping mechanisms 11 and 12 to move back within the framework when in an unclamped position, as shown in Fig. 1.

In order to load and unload a tire from either end of the carriage 10, a lift 18 is provided at loading station A and a lift 19 is provided at loading station C. Lifts 18 and 19 serve to lift a tire into alignment with either end of the carriage 10 so that it may be clamped thereto by the clamping mechanisms 11 and 12 and to lower a tire after it has been heated and moved back to a loading station.

Figure 12:
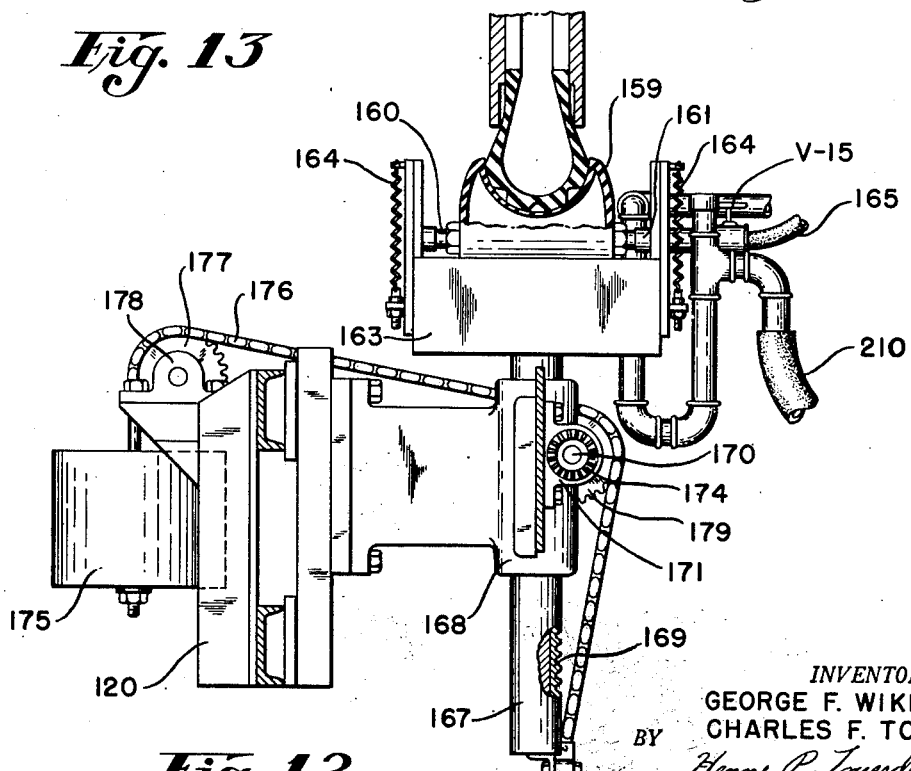
Fig. 12 is an elevational view of the protective liquid applicating means.

Apparatus including an applicator roller for applying a protective coating of liquid to the tread surface of the tire, as shown in detail in Fig. 12, is provided at the heating station B to prevent burning of the tread surface during the heating of the tread grooves. A cooling system, as shown in detail in Fig. 23, consisting of two spray nozzles one positioned at each loading station cools the tire after it has been heated preparatory to its being unloaded.

The carriage 10 is alternately shifted between loading station A and loading station C by apparatus which will be hereinafter described. The carriage 10 is of such a length that when one end is at one of the loading stations A or C, the other end will be at the heating station B. This arrangement allows a tire clamped to the end of the carriage at the loading station, which has been previously heated, to be cooled, unclamped, and then unloaded by one of the lifts 18 or 19 and replaced by a second untreated tire; at the same time, a third tire clamped to the other end is being coated with a protective liquid and is being treated at the heating station B. The alternate loading, shifting, heating, cooling and unloading is automatically controlled to take place in a particular sequence by apparatus which will be later described.

The above description gives an outline of the structure and function of the machine. A more detailed description of the elements is given below.

Tire carriage

The main tire carriage 10 which supports the tires during the heating and cooling operations is supported for linear movement along overhead parallel tracks 13. The tracks 13, which are best shown in Fig. 5, are made from I-beam sections. The carriage 10 has a trolley portion 20 which has four flanged wheels 21 engaging the upper flange of the tracks 13 to support the carriage 10 for linear movement back and forth along the tracks 13. The trolley 20 includes a bed 22 and vertical side members 23 to which the wheels 21 are suitably journaled.

Attached to the bottom of the trolley 20 and extending downwardly therefrom is an elongated supporting member 24 for supporting the tire carrying portion 25 of the carriage 10. The tire carrying portion 25 includes a hollow tube or sleeve 26 attached to the member 24, as best shown in the left hand portion of Fig. 6. A circular clamping plate 27 is mounted for rotation on the right hand end of the sleeve or tube 26 by means of anti-friction bearings 28. A large gear 29 is fastened to the clamping plate 27 by means of radially extending ribs 30. Gear 29 is driven by a pinion 31, as shown in Fig. 1. Pinion 31 is attached to a shaft 32 carried in bearings 33 attached to the top of the sleeve or tube 26. A chain sprocket 34 is attached to the opposite end of the shaft 32 and is driven by a chain 35. The sprocket 34 and the chain 35 are carried within the member 24 which is made hollow for this purpose, as is shown in Fig. 5. The chain 35 extends upwardly through the member 24 and through a hole 36 (Fig. 2) in the bed 22 of the trolley 20 and is driven by a sprocket 37. Sprocket 37 is attached to one end of an elongated shaft 38 (Figs. 2 and 5) carried by suitable bearings 39 secured to the bed 22 of the trolley 20. Shaft 38 is driven by means of a motor M2 through a chain drive 40. Adjustable idler sprockets 41 and 42 (Fig. 5) carried by the member 24 take up any slack that may exist in chain 35. Operation of motor M2 therefore serves to rotate clamping plate 27 through the above described chain drive.

A clamping plate 27a (Fig. 1) carried by the opposite end of the sleeve or tube 26 from the plate 27 is identical with plate 27 and is driven in the same manner as plate 27 by a separate but similar driving mechanism. Motor M1 (Fig. 2) carried by the bed 22 of the trolley 20 rotates the plate 27a through a chain drive similar to that just described and shown in Figs. 1 and 2. Rotation of plate 27a therefore is independent of the rotation of plate 27.

The sleeve or tube 26 adjacent each end thereof carries a fluid cylinder C-3 and C-7 which serve to lock the clamping mechanisms 11 and 12 respectively to the carriage 10 as will be hereinafter described.

Figure 2:
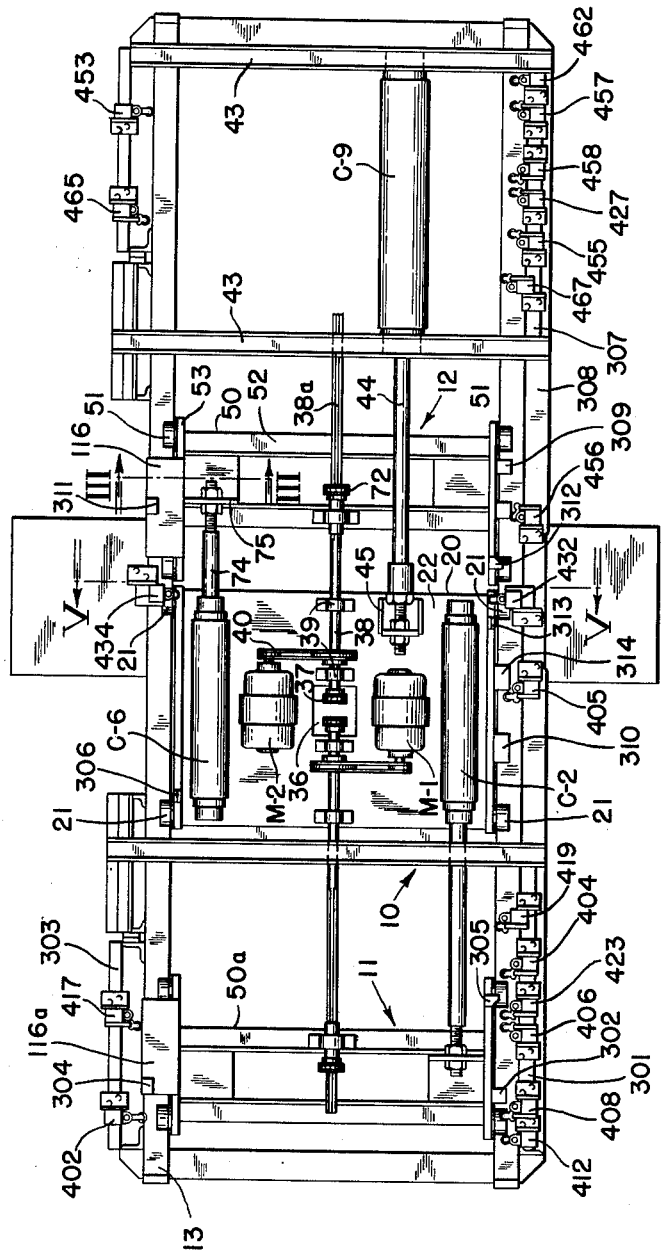
Fig. 2 is a top plan view of the machine.

The carriage 10 is alternately moved along the tracks 13 by means of a fluid motor C-9 (Fig. 2). Motor C-9 is carried by and fastened to channel members 43 extending across the top of the machine and fastened to an extension of the right hand framework 14. The piston rod 44 of the fluid motor C-9 is adjustably attached to a bracket 45 secured to the bed 22 of the trolley 20, as shown in Fig. 2. Fluid motor C-9 is double acting so that fluid pressure applied to one side of the piston or the other will drive the piston rod 44 and carriage 10 in one direction or the other.

As can be seen from Fig. 2, the force applied by the piston rod 44 is not symmetrical with the width of the trolley 20 but is applied off center thereof with the result that the carriage 10 might tend to cant or twist to one side when the force is applied. To alleviate this condition, a shaft 46 (Fig. 5) is provided at each end of the trolley 20. Shaft 46 is free to rotate in spaced bearings 47 attached to the bottom of the trolley 20. A pinion 48 is attached to each end of the shaft 46 and engages a rack 49 attached to the bottom flange of the tracks 13. As the pinion attached to one end of the shaft 46 cannot rotate faster than the pinion attached to the other end of the same shaft, the carriage 10 or the trolley 20 which forms a part thereof cannot cant or twist upon the application of the moving force by the piston rod 44 of the fluid motor C-9.

*Clamping mechanism*

The clamping mechanisms 11 and 12 for clamping a tire to either end of the carriage 10 are identical and the description therefore will be limited in the most part to clamping mechanism 12. As can be best seen in Figs. 1 and 3, the clamping mechanism 12 is supported from and mounted for linear movement along the tracks 13. The clamping mechanism 12 has a trolley 50 including four flange rollers or wheels 51 which engage the tracks 13 and support the clamping mechanism for linear movement along the track. The trolley 50 has a bed 52 and vertical side members 53 to which the wheels 51 are suitably journaled.

Attached to the bottom of the trolley 50 and extending downwardly therefrom is an elongated supporting member 54 (Fig. 1), to the end of which is attached the tire clamping portion. This portion, as best shown in Fig. 6, includes a bracket 55 attached to the member 54, a fluid motor C-8 attached to the bracket 55 and a bearing sleeve 56 also attached to the bracket 55. A circular tire clamping plate 57 is mounted for rotation on the sleeve 56 by means of anti-friction bearings 58. A piston rod 59 is attached to a piston 60 of the fluid motor C-8 and extends through the bearing sleeve 56. A guide sleeve 61 is provided in the bearing sleeve 56 and serves to guide and center the piston rod 59. Piston rod 59 has an enlarged end 62 which can be extended into the bore of the sleeve or tube 26 of the main carriage 10. Fluid cylinder C-7 carried by the sleeve or tube 26 has attached to its piston rod 63 a yoke 64 which is adapted to extend within the bore of the sleeve or tube 26 and engage the piston rod 59 behind the enlarged end 62 and thereby lock the piston rod 59 to the tube 26 and therefore to the carriage 10. When the piston rod 59 is so locked, admission of fluid pressure within the fluid motor C-8 to withdraw the piston rod 59, forces the entire clamping mechanism 12, which is supported by its trolley 50 for free movement along the tracks 13, towards the carriage 10. When a tire is placed between the clamping plate 57 of the clamping mechanism 12 and the clamping plate 27 on the carriage 10, it will be laterally squeezed to distort the tread thereof and will be clamped to the carriage 10 so that it can be moved along with the carriage 10. Fluid motor C-4 of the left-hand clamping mechanism 11 functions in the same manner as motor C-8 to clamp a tire to the left-hand end of its carriage 10 between plates 57a and 27a. Fluid cylinder C-3 functions in the same manner as fluid motor C-7 to lock the piston rod 59a (Fig. 6) to the carriage 10.

In order that the clamping plate 57 may be rotated at the same speed as clamping plate 27, it is provided with a large gear 65, similar to gear 29 on the carriage 10, attached to the clamping plate 57 by radial ribs 66 as shown in Fig. 6. Gear 65 is driven by a pinion 67 (Fig. 1) attached to a shaft 68. Shaft 68 is journaled in bearings 69 secured to the clamping mechanism 12. Shaft 68 has attached to its other end a chain sprocket 70, is driven by a chain 71, which is identical to chain 35 on carriage 10. Chain 71 extends up through member 54 and is driven by a sprocket 72 (Fig. 2) mounted for rotation in bearing 73 fastened to trolley 50. Sprocket 72 is driven by the splined end 38a of shaft 38. As can be seen from Fig. 2, the splined end 38a is of considerable length so that the sprocket 72 and trolley 50 can move a considerable distance relative to the shaft 38 and still be driven thereby. By this structure both clamping plates 57 and 27 are driven by the same shaft 38 and by the same motor M2 so that they are both rotated at the same speed. An identical system is provided to drive clamping plate 57a of the left-hand clamping mechanism 11 from motor M1 (Fig. 2).

While fluid motor C-8 actually supplies the force for laterally squeezing the tire and clamping it to the carriage 10, a fluid motor C-6 (Fig. 2) moves the clamping mechanism toward and away from the carriage 10 when the piston rod 59 is not locked to the carriage 10. The clamping mechanism 12 must be moved away from the carriage 10 in order that a tire may be placed between the clamping plates 27 and 57 and then moved towards the carriage 10 so that the piston rod 59 may be locked to the carriage 10 preparatory to the squeezing and clamping operation. Fluid motor C-6 (Fig. 2) for this purpose is attached to the top of the trolley 20 of carriage 10 as shown in Fig. 2 and has a piston rod 74 adjustably attached to a bracket 75 secured to the trolley 50. Admission of pressure to the fluid motor C-6 moves the clamping mechanism 12 relative to the carriage 10. A similar fluid motor C-2 moves the left hand clamping mechanism 11 relative to the carriage 10.

In order to prevent the trolley 50 from canting in its movement along the tracks 13, it is provided with a shaft 76 (Fig. 3) suitably journaled in bearings 77 attached to the bottom thereof. Pinions 78 attached to each end of the shaft engage the rack 49 carried by the lower flange of the track 13 in the same manner as the pinions 48 of the trolley 20 of the carriage 10.

In order to center the tire properly before it is clamped between the plates 57 and 27, three centering pins 79, 80 and 81, as shown in Fig. 7, are provided on the plate 57. Pin 79 is radially adjustable in a slot 82 (Fig. 7) and includes a sleeve 83 (Fig. 6) having a tapered solid head 84 attached to one end thereof. Sleeve 83 fits over a rod 85 on which it may slide axially. The rod 85 abuts a plate 86 which is attached to a sleeve 87 which is concentric with the rod 85 and the sleeve 83. Sleeve 87 has an enlarged end 88 adapted to engage the front face of the plate 57 and is externally threaded to receive a nut 89 for clamping the sleeve 87 to the plate 57. A helical compression spring 90 is disposed within the sleeve 83 between the head 84 and the end of the rod 85 to normally urge the centering pin in an extended position as shown in Fig. 6. When the clamping mechanism 12 and the carriage 10 are brought together, the centering pin 79 extends through a slot 91 in the clamping plate 27 and engages a plate 92 carried by and secured to the gear 29. When the clamping mechanism 12 is brought toward the carriage 10 to clamp a tire between the plates 57 and 27, the centering pin 79 engages the plate 92 and shortens by reason of the sleeve 83 sliding on the rod 85. When the clamping mechanism 12 is moved away from the carriage 10, the centering pin 79 will extend to insure that there is sufficient length thereof to support the tire. Centering pin 79 constitutes the sole means of support for the tire before the clamping plates 57 and 27 are brought together and after the clamping plates are moved apart.

Centering pins 80 and 81 (Fig. 7) are identical but are spaced adjacent opposite edges of the plate 57. To provide some adjustment for the centering pins 80 and 81, they are mounted on plates 93 and 94 respectively, which are pivoted to the plate 57 adjacent their bottom edges by shoulder bolts 95 and 96 respectively. Clamping screws 97 and 98 extend through arcuate slots 99 and 100 provided in the plates 93 and 94 respectively and thread into the plate 57 so that the pins 80 and 81 may be adjusted and clamped in adjusted position by rotating the plates 93 and 94 around their respective pivots 95 and 96.

The centering pin 79 centers the tire in a vertical direction, therefore it is important that this pin be in a position that is directly above the axis of rotation of the plate 57, as shown in Figs. 6 and 7, during the loading operation. Control means are therefore provided to stop the rotation of the plate 57 exactly at that point when the pin 79 is at a position directly above the axis of rotation. The control means includes a limit switch 459 (Fig. 1) which is actuated by a plunger 101 slidably mounted in bearings 102 secured to a plate 103 which in turn is fastened to the bracket 55. The plunger 101 is actuated by a cam 104 secured to the face of the gear 85. The cam 104 is positioned to actuate the plunger 101 and the limit switch 459 just before the pin 79 is at a position directly above the axis of rotation of the plate 57. Actuation of the switch 459 stops motor M2, and therefore the rotation of plate 57. After actuation of the switch, the plate 57 rotates a few degrees to bring the pin 79 to the position directly above the axis of rotation and to release the switch 459. Rotation of plate 57a is stopped by a similar cam 104a and a switch 409.

Tire lifting mechanism

Figures 3, 4:
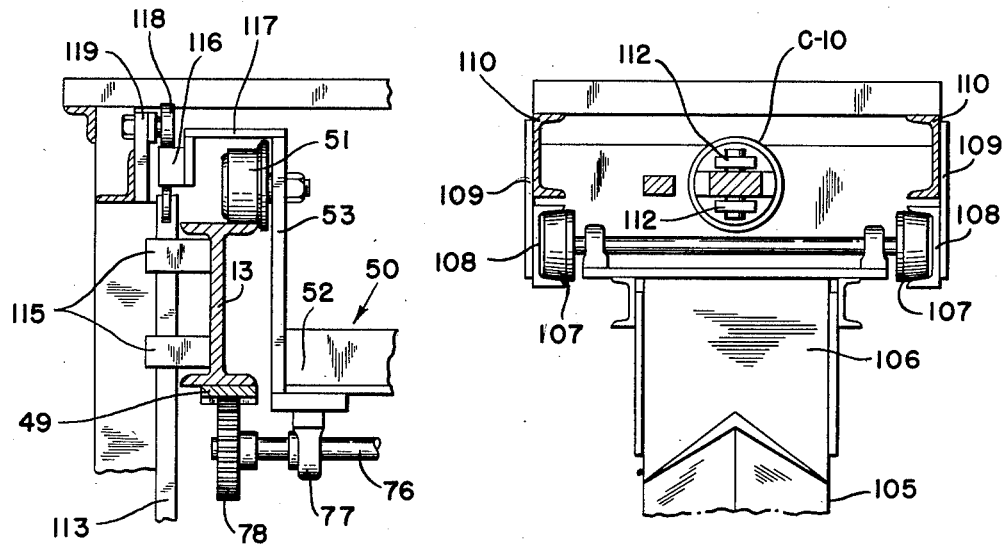
Fig. 3 is a sectional view taken along the line III—III of Fig. 2 showing part of the travelling mechanism for the clamping mechanism.
Fig. 4 is a sectional view taken on the line IV—IV of Fig. 1 showing part of the tire lifting mechanism.

The tire lifts 18 and 19 are positioned respectively at loading station A and loading station C. The two tire lifts are identical, so the description will be limited to the right-hand tire lift 19. The tire lift 19 includes a hook shaped trough member 105 which is V-shaped in cross section as best seen in Figs. 1, 4 and 4a. The tire to be heated is placed in the member 105 in a vertical position. Member 105 is attached at its rear end to a carriage 106. Carriage 106 has four tapered wheels 107 (Figs. 4 and 4a) which ride in a pair of spaced vertically extending channel shaped tracks 108.

Tracks 108 are attached by plates 109 to a pair of vertically extending channel members 110 secured to the frame 14 at the top and to the floor at the bottom. Attached to the carriage 106 is a piston rod 111 of a fluid motor C-10. The motor C-10 has its upper end attached to overhead brackets 112. The brackets 112, fluid motor C-10, tracks 108, and carriage 106 are positioned to the rear of the machine so as not to interfere with the movement of the clamping mechanism. When pressure is admitted to the fluid motor C-10 to withdraw the piston rod 111, the carriage 106 moves upwardly guided by the wheels 107 engaging the channel shaped tracks 108 and carries with it the member 105 which supports the tire.

To insure that the lift 19 will not engage the tire prior to the unclamping operation, and before the clamping mechanism 12 has moved away from the carriage 10, a stop rod 113 as shown in Fig. 1 and Fig. 3 is provided. The rod 113 carries a roller 114 at the top end thereof and is supported for linear up and down movement in bearings 115 secured to the horizontal track 13. Upon upward movement of the lift 19, the carriage 106 engages the lower end of the stop rod 113 and forces it upwardly. If the clamping mechanism 12 has not completely moved away from the carriage 10, the roller 114 of the stop rod will engage a stop block 116 attached to a plate 117 secured to the side member 53 of the trolley 50 of the clamping mechanism 12, and further upward movement of the lift 19 will be stopped. When the clamping mechanism 12 which carries stop 116 moves further to the right, out of position of the rod 113, lift 19 can continue its movement upwardly to engage the tire. In order to resist the force applied by the rod 113 on the stop block 116, a pair of rollers 118 are journaled in a bracket 119 secured to the frame of the machine so as to engage the opposite side of the block from the side engaged by the rod 113. The left hand tire lift 18 is identical to lift 19 and is operated by a fluid motor C-1.

Tire heating apparatus

Figure 10:
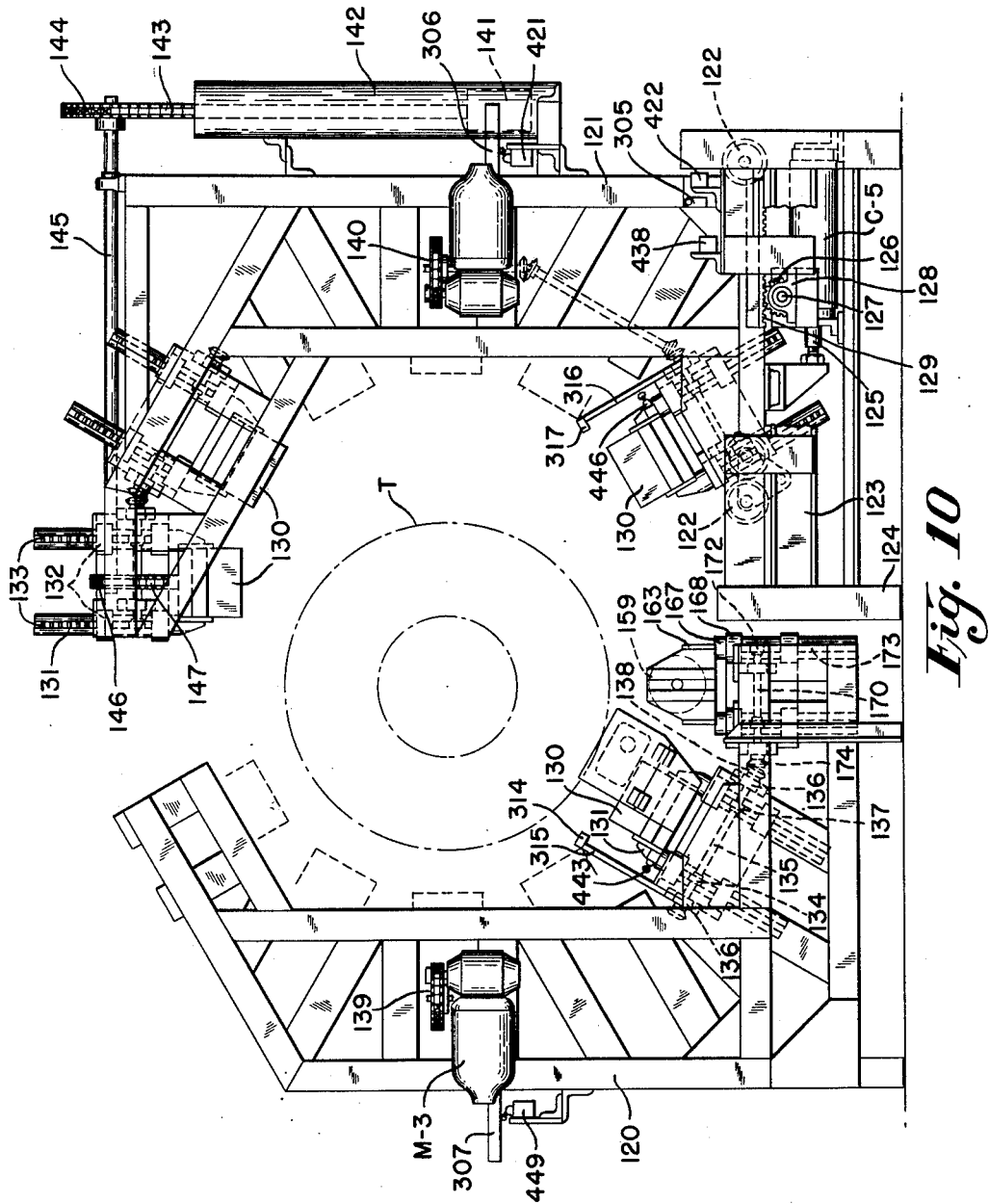
Fig. 10 is a similar side elevational view of the heating means showing the heating units in a retracted position.
Figure 11:
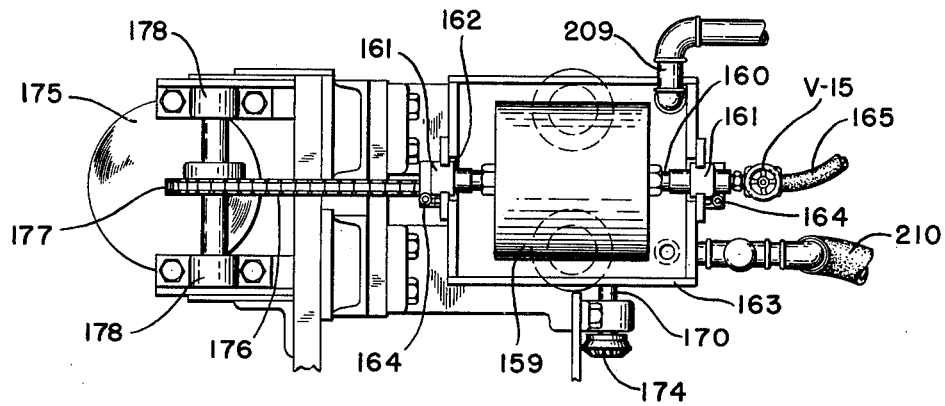
Fig. 11 is a top plan view of the protective liquid applicating means.

The tire heating apparatus which is positioned at the heating station B and surrounds the path of movement of the carriage 10 is best shown in Figs. 9 and 10. The heating apparatus includes two spaced frames 120 and 121. Frame 120 is stationary while frame 121 may be moved towards and away from frame 120. Frame 121 is mounted for movement by means of wheels 122 which engage a track 123 supported by a base 124.

Frame 121 is moved by means of a fluid motor C–5 mounted on the base 124, the piston rod 125 of which is attached to the lower portion of the frame 121. The relative movement of the frames 120 and 121 is to provide sufficient space for the carriage 10 to move from loading station A to loading station C. Canting or twisting of the frame 121 as it is moved is prevented by means of pinions 126 (Fig. 10) secured to each end of a shaft 127 mounted in bearings 128 secured to the base 124. The pinions engage racks 129 attached to each side of the frame 121 and prevent canting or twisting of the frame in the same manner as previously described in connection with pinions 48 (Fig. 5) on carriage 10.

Spaced around frames 120 and 121 in a semicircular pattern are a plurality of heating units 130, which, when the frame 121 is moved towards frame 120 form a circular pattern around the tire. Each of the heating units 130 is mounted for radial movement on a pair of rods 131 which slide in bearings 132 mounted on the frames 120 and 121. Each of the rods 131 has a rack 133 secured in a slot in the surface thereof. The rack is engaged by a pinion 134 carried by a short shaft 135 suitably journaled at each end in bearings 136 secured to the frame 120 or frame 121. The pinion 134 engages the rack 133 through a slot 137 in the bearing 132. Each of the shafts 135 have bevel gears 138 attached to their ends which engage bevel gears carried by the shaft of an adjacent heating unit. An electric motor M–3 drives all the shafts 135 carried by the frame 120 by means of a chain drive 139 and an electric motor M–4 drives all the shafts 135 carried by the frame 121 by means of a chain drive 140. Fig. 9 shows the heating units 130 in their innermost position while Fig. 10 shows them in their retracted position.

The heating units 130 on the frame 121 are counterbalanced by means of a weight 141 which is enclosed by a guard 142. The weight 141 is carried on the end of a chain 143 which is attached to and engages a sprocket 144. Sprocket 144 is attached to a shaft 145. A second sprocket 146 is attached to the other end of the shaft 145 and a chain 147 is attached at one end to the uppermost of the heating units 130 and at the other end to the sprocket 146.

The details of the heating units 130 are best shown in Figs. 15, 16 and 17. The heating units 130 are semi-circular in cross-section so as to surround the tread surface of the tire as shown in Fig. 15. Heat is supplied by a continuous metallic resistor strip 148 which is bent to pass a number of times across the face of the unit 130. Terminal connectors 149 are provided at each end of the resistor strip 148 and the individual resistor strips of each of the heating units are connected in series to a source of electrical energy (not shown). Passage of electric current through the resistor strip 148 heats the strip to a point of incandescence and the tread is heated by the radiant heat from the incandescent strip. The strip 148 is backed by and supported by a block of refractory material 150 which, in turn, is supported by side and bottom plates 151 and 153 and bolts 154 which extend through the block 150 and plates 151. Supporting rods 131 are attached to plates 151.

In order to control the movement of the heating elements toward the tread of the tire to insure that the heating element will be at a predetermined distance from the tread regardless of the size of the tire, one of the heating elements is provided with a light source 441 and a photoelectric switch 442. The light source 441 is carried by a supporting bracket 157 attached to one side of the unit 130 and the switch 442 is carried by a bracket 158 attached to the opposite side of the unit 130. A beam of light from the light source 441 is directed across the front of the unit 130 so that as the heating unit is moved toward the tread of the tire, the beam of light will be interrupted by the tire when the heating element is a predetermined distance from the tire. Interruption of the light beam operates the photoelectric switch 442 to stop the motors M–3 and M–4 which move the heating elements radially inwardly toward the tread of the tire.

*Tread coating apparatus*

The tread coating apparatus which applies a coating of liquid to the tread surface of the tire while it is being heated, to prevent scorching of the tread, is shown in detail in Figs. 11, 12, 13 and 14. The apparatus includes a hollow, cylindrical applicator roll 159 made of a flexible material such as rubber. The applicator roll 159 is carried by an axially extending spindle 160 which is suitably journaled at each end for free rotation in bearings 161. The bearings 161 are mounted to slide vertically in slots 162 provided in the end wall of a liquid reservoir 163. Springs 164, attached at their lower end to bearings 161 and at their upper end to reservoir 163 normally urge the bearings 161, spindle 160 and roller 159 upwardly so that the roller 159 has a floating action relative to the reservoir. The spindle 160 is hollow and is connected to an air supply hose 165. Admission of air pressure to the flexible roller 159 by means of a control valve V–15 controls the rigidity of the roller 159. As can be seen in Fig. 12, the roller 159 has flexible side walls as well as a flexible periphery so that the roll when forced against the tire will wrap around the tread surface thereof to contact the entire surface. Control of the air pressure by the valve V–15, controls the flexibility of the roller 159 and its ability to wrap around and contact the tread surface of the tire. Liquid to be applied to the tread surface of the tire, is supplied to the reservoir 163 by a flexible conduit 209 and overflow is carried away by flexible conduit 210.

The reservoir 163 is attached to a pair of rods 167 (Figs. 9, 10 and 12) which slide in bearings 168 similar to bearings 132 of the heating units 130 which, in turn are attached to the frame 120 of the heating apparatus, as best shown in Fig. 10. A rack 169 is provided in a slot in the surface of the rod 167. A short shaft 170 is suitably journaled in a bearing 171 and carries pinions 172 which engage the rack 169 through slots 173 in the bearings 168. A bevel gear 174 is attached to the end of the shaft 170 and engages the beveled gear 138 (Fig. 10) of an adjacent heating unit 130. Thus the applicator roller 159 and reservoir 163 is mounted for radial movement in the same manner as the heating units 130 and is moved radially simultaneously with the heating units by the motor M–3.

The roller 159 and reservoir 163 are counterbalanced by a weight 175 (Figs. 11 and 12) attached to a chain 176 which engages a sprocket 177 rotatably mounted in bearings 178 secured to the frame 120. The chain 176 is directed over a sprocket 179 carried by the shaft 170 and is attached to the lower end of the rod 167, as shown in Fig. 12.

Figure 13:
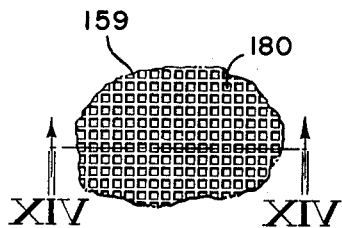
Fig. 13 is a partial plan view of the peripheral surface of the protective liquid applicator roller.
Figure 14:
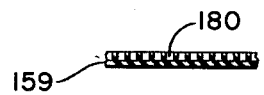
Fig. 14 is a sectional view taken on the line XIV—XIV of Fig. 13.

When the roller 159 is moved radially upwardly and engages the tread of the rotating tire carried by the carriage 10 it will be rotated thereby and will pick up liquid from the reservoir 163 and apply it to the surface of the tread of the tire. To insure that the liquid will stick to the roller, the peripheral surface of the roller 159 is provided with a plurality of indentations 180 forming a waffle-like design as shown in Fig. 13. Each of the indentations 180 form a small pocket (Fig. 14) which carries a small portion of the liquid and prevents it from flowing off the roller as it is rotated.

*Fluid system*

The fluid pressure system including the fluid motors is shown diagrammatically in Fig. 21.

The system includes a main pressure line 200 and a main exhaust line 201. Each of the fluid motors are connected to the pressure line 200 and exhaust line 201 by a pair of conduits. A solenoid operated reversing valve is provided in each pair of conduits whereby the individual fluid motors may be operated in either direction by reversing the valve. The reversing valve for fluid motor C–1 is designated as V–1, for fluid motor C–2 as V–2, etc.

Speed control valves designated as SC are provided in each of the pair of conduits adjacent each fluid motor. The function of these speed control valves is to adjust the speed of the individual motors so that they will operate in a particular space of time. As will be later brought out, the machine functions in a predetermined time sequence and it is therefore necessary that each of the fluid motors performs its operation in its allotted time. Adjustment of the speed control valves SC is an installation feature and once adjusted, normally do not need to be again adjusted.

The piping system for all the fluid motors is the same with the exception of the piping system for motors C–1 and C–10, which operate the lifts 18 and 19. As previously described when one of the lifts 18 or 19 moves upwardly, it engages a stop rod 113 which is free to move upwardly unless the clamping mechanism 12 is in the way, in which case a roller 114 carried by the top end of the rod 113 engages a stop block 116 secured to the trolley 50 of the clamping mechanism 12 and prevents upward movement of the lift. When movement of the lift is thus stopped, one side of the fluid motor is open to the pressure line, and the other side is open to the exhaust line. If the exhaust side of the cylinder is left open so that the pressure therein can exhaust out through the exhaust line, there will build up in the fluid motor a considerable difference in pressure with the result that when the clamping mechanism 12 is moved to release the rod 113 and therefore the lift 19, the lift would make a sudden jump because of this excess differential in pressure in the motor and would probably jolt the tire out of the lift. To alleviate this condition, a special valving system for fluid motors C–1 and C–10 is provided as shown in Fig. 21.

In this system, a by-pass line 202 and 203 for motors C–1 and C–10, respectively, is provided in the conduit connecting the exhaust side of the fluid motor around a pressure reducing valve V–12 or V–14. The valve V–12 or V–14 is set to allow only a very small leakage of pressure from the exhaust side of the fluid motor. The majority of the pressure is normally exhausted through the by-pass 202 or 203. A cam actuated valve V–11 or V–13 is provided in each of the by-pass lines 202 and 203 respectively. Valves V–11 and V–13 are normally open and allow pressure to exhaust freely from the motors C–1 and C–10. Cams 204 and 204a (Fig. 1) are provided on the stop rods 113 and 113a respectively at such a position that they will operate the valves V–11 or V–13 and close them at the same time that rod 113 engages the stop block 116 or 116a on the clamping mechanism 12 or 11. In this manner, leakage of pressure is prevented from the exhaust side of the fluid motors when the lift is stopped by the rod 113 and block 116 and there will be no sudden jump of the lift when it is released. The small bit of leakage through valve V–12 or V–14 merely insures that there will be sufficient differential pressure in the fluid motor to initially start the motor after the stop block 116 has been moved out of the way of the stop rod 113.

Fig. 22 shows a circulating system for the coating fluid which is applied to the tread surface of the tire by the applicator roll 159. The system includes a motor 206, a pump 207 and a sump tank 208. The coating liquid is pumped from the sump tank 208 through a conduit 209 into the reservoir 163 and overflows through a conduit 210 from the reservoir 163 back into sump tank 208.

Fig. 23 discloses the cooling system for cooling the tires after the heat treatment operation. The system includes two spray nozzles, 211 and 212, connected to a water supply line 213. Normally closed solenoid operated, self-closing valve V–16 admits water to the nozzle 211 and normally closed solenoid operated self-closing valve V–17 admits water to nozzle 212. Nozzle 211 is positioned adjacent loading station A and nozzle 212 is positioned adjacent loading station C to spray cooling water on a heated tire when it is moved to one of the loading stations preparatory to unloading it.

*Electrical circuit and operating cycle*

Figure 18:
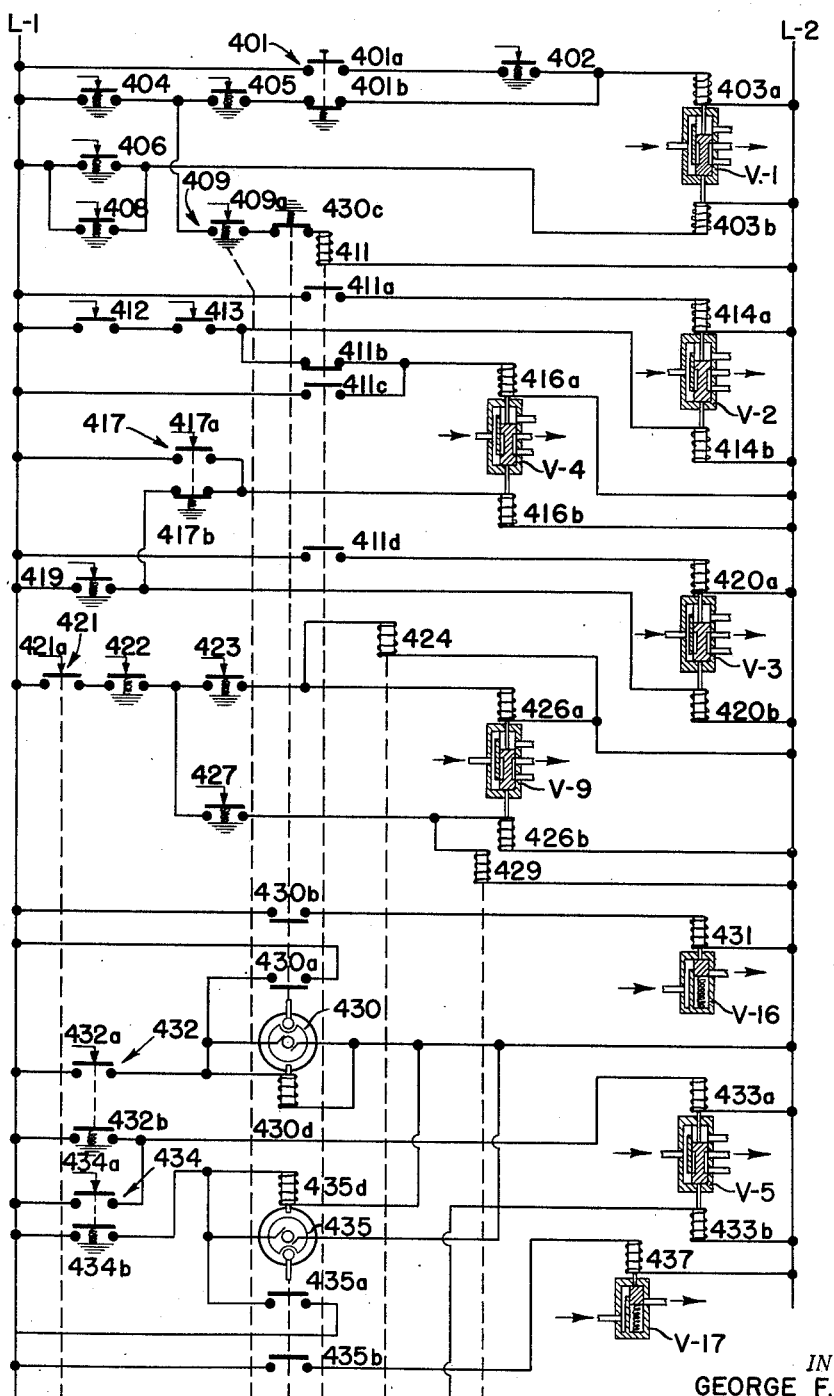
Fig. 18 is an elementary wiring diagram of a portion of the electrical circuit for the machine.
Figure 19:
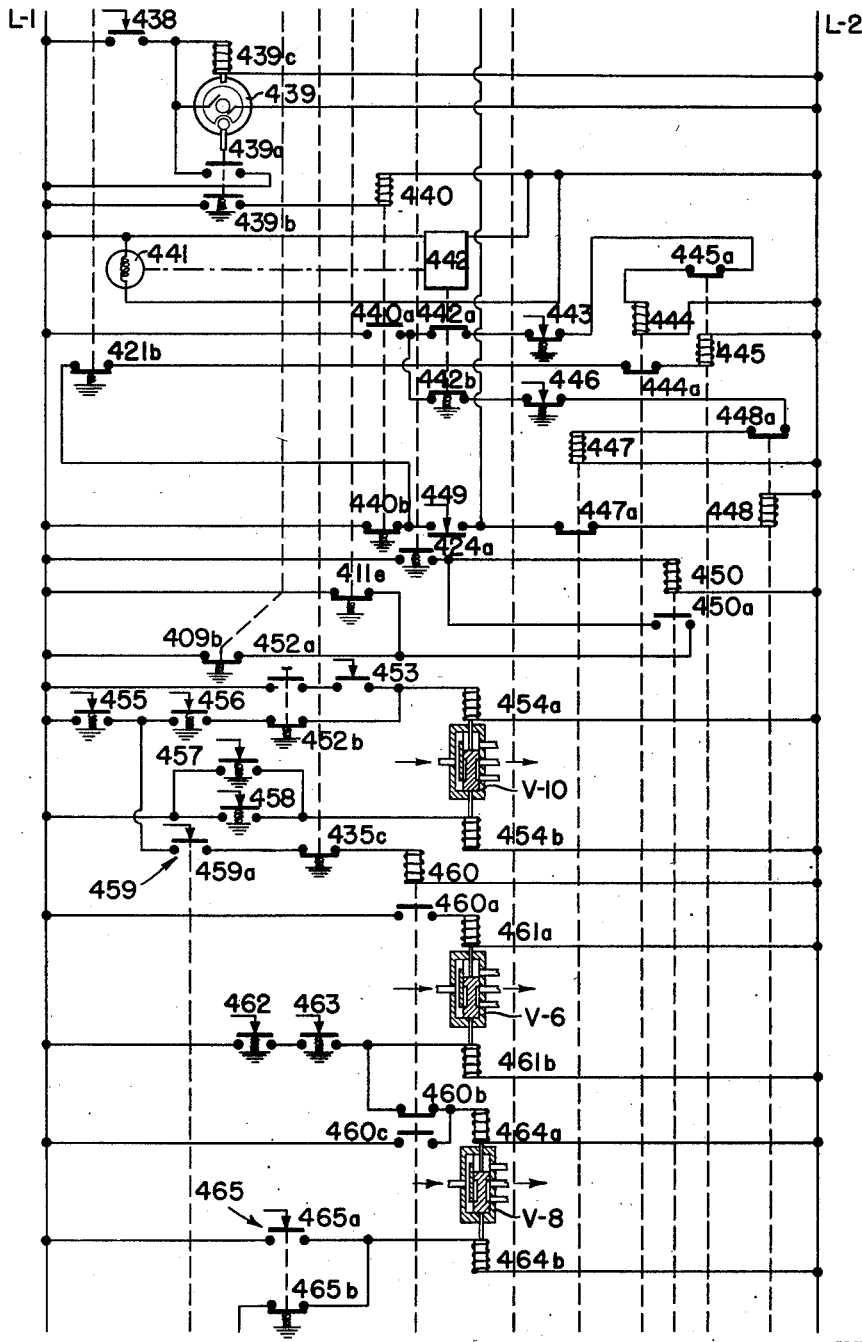
Fig. 19 is a continuation of the electrical diagram of Fig. 18.
Figure 20:
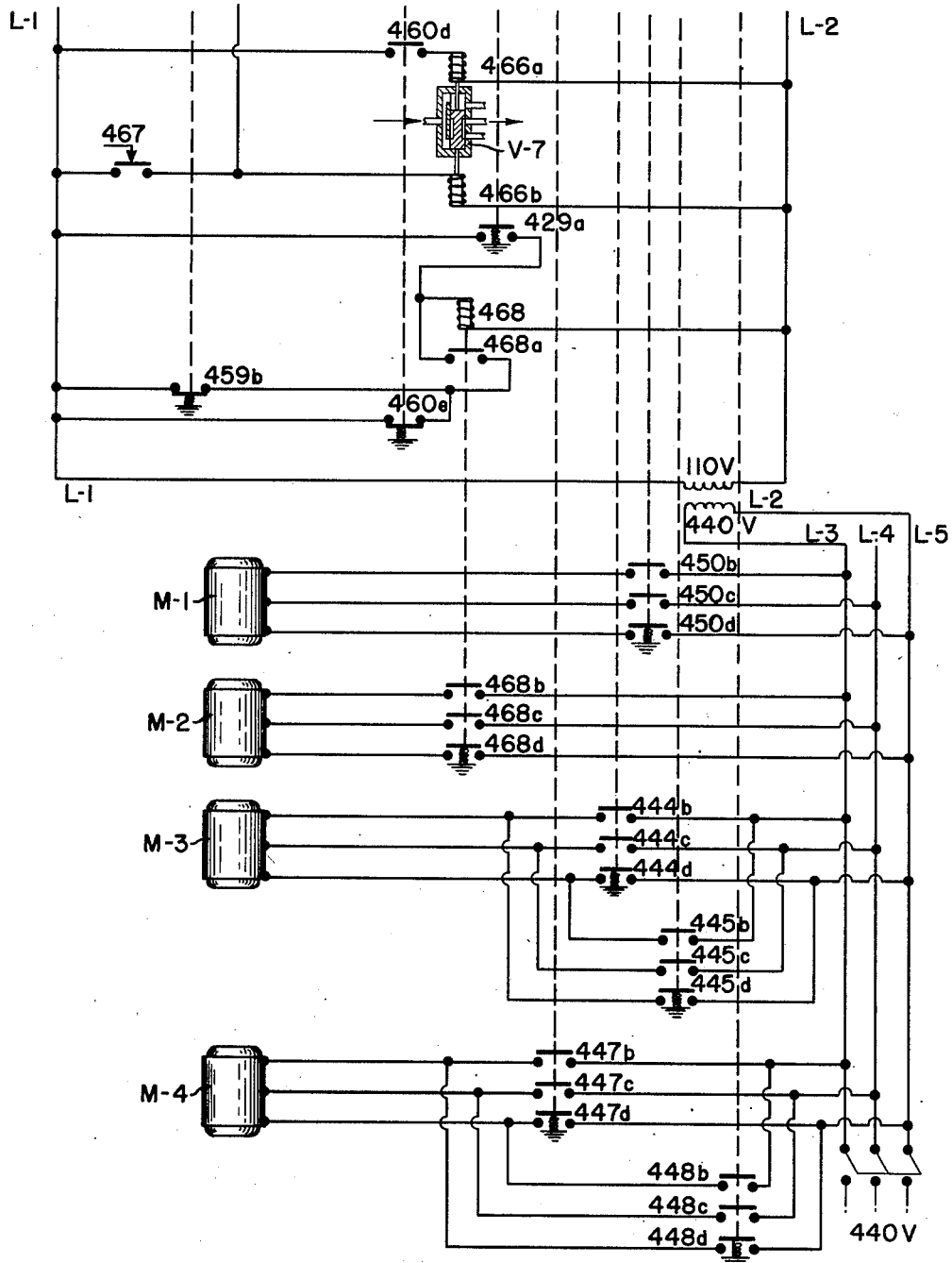
Fig. 20 is a continuation of the electrical diagram of Fig. 19.

The electrical circuit for the machine is shown in Figs. 18, 19 and 20. Fig. 19 is a continuation of Fig. 18, and Fig. 20 is a continuation of Fig. 19. The complete circuit includes a two-wire 110 volt control circuit L1, L2 and a three-wire 440 volt power circuit L3, L4 and L5. The two-wire circuit L1 and L2 derives its electrical energy from the three-wire power circuit L3, L4 and L5 by means of a transformer 409. In the drawings, all switches are shown in the normal or non-actuated position and all solenoids in a non-energized condition. The reversing valves V–1, V–2, V–3, etc. for fluid motors C–1, C–2, C–3, etc. each have two solenoids—one for shifting the valve each way. To shift the valve, it is necessary to de-energize one solenoid and energize the other. Merely de-energizing one solenoid will not shift the valves.

On initial operation of the machine, there is no tire in the machine, the main carriage 10 is in its extreme left position, the right-hand clamping mechanism 12 is in clamping position locked to the carriage 10, the frames 120 and 121 of the heating means are apart and the heating units 130 are retracted. Both lifts 18 and 19 are in their lowermost position.

The left-hand clamping mechanism 11 in the extreme left position actuates limit switches 412 and 402 so that their normally open contacts are closed. Limit switch 412 is secured to a plate 301 carried by the frame 14 adjacent the track 13 (Fig. 2) and is operated by a block 302 secured to the side of the trolley 50 of the left-hand clamping mechanism 11. Limit switch 402 is located on a plate 303 secured to the frame 14 adjacent to the track 13 on the opposite side of the machine from plate 301 and is operated by a block 304 secured to the trolley 50 of the left-hand clamping mechanism 11.

The frame 121 of the heating means in its open position actuates limit switch 422 to close its normally open contacts. Limit switch 422 is secured to the base 124 (Fig. 10) and is operated by a block 305 secured to the frame 121. The heating elements 121 in their retracted position as shown in Fig. 10 actuate limit switches 421 and 449. Limit switch 421 is secured to the frame 121 and is operated by a bar 306 secured to one of the heating units 130 carried by the frame 121. Limit switch 449 is carried by frame 120 and is operated by a bar 307 secured to one of the heating units 130 carried by frame 120.

Thus prior to starting a cycle of operation, normally open limit switches 412, 402 and 422 are closed, normally closed limit switch 449 is open, normally open contacts 421a of limit switch 421 are closed and normally closed contacts 421b are open.

To start a cycle of operation, assuming that the heating elements 130 have been brought up to proper temperature and that control circuit L1, L2, and power circuit L3, L4, L5 has been energized by closing switch 470 (Fig. 20), the operator first rolls a tire onto lift 18 and then manually presses a push button 401. Push button 401 has two pairs of contacts, normally open contacts 401a and normally closed contacts 401b. Closing of contacts 401a completes a circuit through closed limit switch 402 to energize solenoid 403a which shifts valve V-1 to admit pressure to fluid motor C-1 to raise the left-hand tire lift 18 and the tire carried thereby into alignment with the left-hand end of the carriage 10. Release of push button 401 de-energizes solenoid 403a but valve V-1 remains in the shifted position until solenoid 403b is energized to shift it in the opposite direction as will be later described.

The left-hand lift 18 continues to move upwardly until the tire is in alignment with the end of the carriage 10. At this point the lift 18 actuates a normally open limit switch 413 located in the path of movement of the lift 18 (Fig. 1). Closing of limit switch 413 completes a circuit through closed limit switch 412 to energize solenoid 414b to shift valve V-2 to admit pressure to fluid motor C-2 to pull the clamping mechanism 11 towards the carriage 10. As the clamping mechanism 11 moves towards the carriage 10, the centering pins 79, 80 and 81 enter the tire supported by the lift 18 and center it relative to the clamping plates 57a and 27a. Closing of limit switch 413 also provides a circuit through closed limit switch 412 and the normally closed contacts 411b of a relay 411 to energize solenoid 416a which shifts valve V-4 to admit pressure to fluid motor C-4 of the clamping mechanism 11 to extend the piston rod 59a thereof into the bore of sleeve or tube 26 of the main carriage 10.

As the left-hand clamping mechanism 11 is pulled towards the carriage 10, limit switch 412 and limit switch 402 are released and limit switch 406 also carried by the plate 301 is actuated by block 302 on the trolley 50 of the left-hand clamping mechanism 11 (Fig. 2). Actuation of limit switch 406 completes a circuit to energize solenoid 403b to reverse valve V-1 and thereby reverse fluid motor C-1 to lower the left-hand lift 18. At this point, the tire is hanging on the centering pins 79, 80 and 81. Release of limit switch 412 de-energizes solenoids 414b and 416a.

As the left-hand clamping mechanism 11 continues to be pulled towards the carriage 10, limit switch 406 is released and a block 305 secured to the trolley 50a of the left-hand clamping mechanism 11 actuates a limit switch 419 carried by the plate 301. Release of limit switch 406 de-energizes solenoid 403b. Actuation of limit switch 419 completes a circuit to energize a solenoid 420b to shift valve V-3 to admit pressure to fluid cylinder C-3 to extend its piston rod 63a and fork 64a (Fig. 6) into the bore of the tube 26 of the carriage 10 to engage the piston rod 59a of the fluid motor C-4 behind its enlarged head 62a to thereby lock the rod 59a to the carriage 10. Actuation of limit switch 419 also completes a circuit through normally closed contacts 417b of limit switch 417 to energize solenoid 416b to reverse the valve V-4 to withdraw the piston rod 59a of the fluid motor C-4 and thereby draw the clamping mechanism 11 and the carriage 10 tightly together to laterally squeeze the tire between the clamping plates 57a and 27a to distort the tread thereof and to clamp it to the left-hand end of the carriage 10.

As the clamping mechanism 11 is pulled tightly against the carriage 10 to squeeze and clamp the tire, block 305 releases limit switch 419 and block 302 (Fig. 2) actuates limit switch 423 carried by plate 301. Releasing limit switch 419 de-energizes solenoids 416b and 420b. Actuation of limit switch 423 completes a circuit through closed contacts 421a of limit switch 421 and closed limit switch 422 to energize the coil of control relay 424 to close the normally open contacts 424a. Closing of contacts 424a completes a circuit to energize motor control relay 450 to close normally open contacts 450b, 450c, 450d to start the motor M-1 which rotates the clamping plates 27a and 57a and the tire clamped therebetween. Actuation of limit switch 423 also completes a circuit through closed contacts 421a of limit switch 421 and limit switch 422 to energize solenoid 426a to shift the valve V-9 to admit pressure to the fluid motor C-9 to shaft the main carriage 10, the left-hand clamping mechanism 11 which is clamping a tire to the left-hand end of the carriage 10, and the right-hand clamping mechanism 12 as a unit to the right, to bring the tire clamped on the left-hand end into the heating station B and to extend the right-hand end of the carriage into the loading station C.

Near the end of the movement of the carriage 10 to the right, it actuates a limit switch 434 secured to the side of the machine (Fig. 2) by means of a block 306 secured to the side of a trolley 20 of the carriage 10. At the same time, limit switch 423 is released thereby deenergizing control relay 424 which opens contacts 424a. Motor control relay 450 remains energized through a holding circuit including closed contacts 450a of the motor control relay and normally closed contacts 409b of limit switch 409, so that rotation of the tire clamped to the left-hand end of the carriage 10 will continue. Release of limit switch 423 also de-energizes solenoid 426a. Actuation of limit switch 434 closes its normally open contacts 434a and 434b. Closing of contacts of 434a completes a circuit to energize solenoid 433a which shifts valve V-5 to admit pressure to the fluid motor C-5 to move the frame 121 toward the frame 120 of the heating means. Closing of the contacts 434b energizes the clutch solenoid 435d of a timer 435 to start the timer running. The timer 435 includes a cam which closes normally open contacts 435a, 435b and opens normally closed contacts 435c. Closing of contacts 435b completes a circuit to energize solenoid 437 to shift normally closed valve V-17 to allow cooling water to spray from nozzle 212 at the right-hand loading station C. Closing of contacts 435a provides a holding circuit for the timer 435 around the contacts 434b of the limit switch 434.

Completion of the movement of the carriage 10 to the right releases limit switch 434 thereby de-energizing solenoid 433a. Timer 435 continues to run because of the holding circuit provided by its contacts 435a. Completion of the movement of the carriage 10 and the clamping mechanism 11 and 12 locked thereto actuates limit switch 455 carried by a plate 307 (Fig. 2) secured to frame 14 adjacent the track 13 and momentarily actuates limit switch 456 carried by a plate 308 also secured to frame 14 adjacent the track 13. Limit switch 455 is actuated by a block 309 secured to the trolley 50 of the right-hand clamping mechanism 12 and limit switch 456 is actuated by block 314 secured to the trolley 20 of the main carriage 10. Closing of limit switches 455 and 456 completes a circuit through normally closed contacts 452b of push button 452 to energize solenoid 454a which shifts valve V-10 to admit pressure to fluid motor C-10 to raise the right-hand lift 19 until it is stopped by the engagement of the stop rod 113 with the stop block 116 (Fig. 3) carried by the trolley 50 of the right-hand clamping mechanism 12.

Movement of frame 121 toward frame 120 of the heating means releases limit switch 422 to open it and momentarily actuates limit switch 438 carried by the frame 124 (Fig. 10). Actuation of limit switch 438 completes a circuit to energize clutch coil 439c of a timer 439 and starts timer 439 running. Timer 439 controls the heating time of the tire. Timer 439 includes a cam which closes its normally open contacts 439a and 439b. Closing of contacts 439a provides a holding circuit for timer 439 around limit switch 438 which is only momentarily closed. Closing of contacts 439b completes a circuit to energize control relay 440 to close normally open contacts 440a and to open normally closed contacts 440b. Closing of contacts 440a completes a circuit through normally closed contacts 442a of photoelectric switch 442 and normally closed contacts of limit switch 443, and through normally closed contacts 445a of control relay 445 to energize motor control relay 444. Energization of motor control relay 444 opens normally closed contacts 444a and closes normally open contacts 444b, 444c, and 444d to start motor M-3 which moves the heating units 130 and the applicator roller 159 on the frame 120 radially inwardly toward the tire clamped to the left-hand end of carriage 10. Closing of contacts 440a also completes a circuit through normally closed contacts 442b of photo-electric switch 442, normally closed limit switch 446 and normally closed contacts 448a of control relay 448 to energize motor control relay 447. Energization of motor control relay 447 opens normally closed contacts 447a and closes normally open contacts 447b, 447c, and 447d to start operation of motor M-4 which moves the heating units 130 on the frame 121 radially inwardly. The heating units 130 continue to move inwardly toward the tire clamped to the left-hand end of the carriage until the light beam from the light source 441 is interrupted by the tread of the tire. Interruption of the light beam actuates photo-electric switch 442 to open contacts 442a and 442b. Opening of contacts 442a de-energizes motor control relay 444 to close contacts 444a and open contacts 444b, 444c and 444d which stop motor M-3 and therefore the inward movement of heating units 130 and the roller 159 carried by frame 120. Opening of contacts 442b de-energizes motor control relay 447 to close contacts 447a and open contacts 447b, 447c and 447d to stop motor M-4 and therefore the inward movement of the heating elements 130 carried by the frame 121. If there had been no tire clamped to the carriage 10, the heating units 130 would move inwardly until they actuated limit switches 443 and 446 to break the circuit to motor control relay 444 and motor control relay 447 to stop the motors M-3 and M-4. Limit switch 443 is secured to one of the sliding rods 131 which carry the heating units 130 on frame 120 (Fig. 10) and is actuated by a cam 314 carried by a rod 315 attached to the side of one of the bearings 132 actuated by a cam 316 carried by a rod 317 attached to the side of one of the bearings 132.

At this point in the cycle of operation, a tire clamped to the left-hand end of the carriage 10 has been moved into the heating station B, the heating units 130 have been moved inwardly to heat the tread grooves of the tire as it is rotated and the applicator roll has moved inwardly to apply a coating of protective liquid to the tread surface of the tire while it is being heated.

The timer 435 times out and opens contacts 435a, and 435b and closes contacts 435c. Opening of contacts 435a de-energizes solenoid 437 and valve V-17 closes cutting off the water supply to nozzle 212 at the right-hand loading station C. Closing contacts 435c completes a circuit through closed limit switch 455 and contacts 459a of limit switch 459 on the clamping mechanism 12 to energize control relay 460. On this initial cycle limit switch 459 must be manually operated as gear 65 which carries the actuating cam 104 is not rotating. On the repeating cycles, the gear 65 will be rotating and will actuate switch 459 automatically. Energization of relay 460 closes normally open contacts 460a, 460c, 460d and opens normally closed contacts 460b, 460e. Normally closed contact 460b opens before normally open contact 460c closes. Closing of contacts 460a completes a circuit to energize solenoid 461a which shifts valve V-6 to admit pressure to fluid motor C-6 to move the right-hand clamping mechanism 12 to the right and away from the main carriage 10. Closing of contacts 460c completes a circuit to energize solenoid 464a to shift valve V-8 to admit pressure to fluid motor C-8 to extend its piston rod 59. Closing of contacts 460d completes a circuit to energize solenoid 466a to shift valve V-7 to admit pressure to fluid cylinder C-7 to withdraw its piston rod 63 to thereby unlock the piston rod 59 from the sleeve 26 of the carriage 10.

As the right-hand clamping mechanism 12 moves to the right, it releases stop rod 113 and allows the right-hand lift 19 to continue its movement upwardly and actuates limit switch 463 but this switch has no effect as limit switch 462 is not actuated and no circuit is completed. Continued movement of the clamping mechanism 12 to the right also releases limit switch 455 which breaks the circuit to relay 460 so that it becomes de-energized and in turn de-energizes solenoids 461a, 464a and 466a.

Continued movement of the right-hand clamping mechanism 12 actuates limit switch 457 and limit switch 465. Limit switch 465 is actuated by block 311 (Fig. 2) secured to the trolley 50 of the right-hand clamping mechanism 12 and limit switch 457 is actuated by block 309 secured to the trolley 50 of the clamping mechanism 12. Actuation of limit switch 457 completes a circuit to energize solenoid 454b to shift valve V-10 to admit pressure to fluid motor C-10 to lower the right-hand tire lift 19. Actuation of limit switch 465 closes normally open contacts 465a to complete a circuit to energize solenoid 464b to shift valve V-8 to admit pressure to fluid motor C-8 to withdraw its piston rod 59.

The right-hand clamping mechanism 12 moves completely to the right and releases limit switches 457 and 465 and actuates limit switches 462 and 453. Release of limit switch 457 de-energizes solenoid 454b and release of limit switch 465 de-energizes solenoid 464b. Limit switch 453 is actuated by block 311 carried by the block 116 (Fig. 2) secured to the trolley 50 of the right-hand clamping mechanism 12 and limit switch 462 is actuated by block 309 also carried by the trolley 50 of the clamping mechanism 12. Actuation of limit switches 462 and 453 completes the automatic cycle of the machine in the movement of the carriage 10 to the right except for the timing out of the timer 439 which controls the heating time of the tire carried on the left-hand end of the carriage 10. The timer 439 may time out either before or after initiation of the automatic cycles of the machine to move carriage 10 to the left.

Timing out of timer 439 which controls the heating time of the tire opens contacts 439b to de-energize control relay 440. De-energization of control relay 440 opens contacts 440a and closes contacts 440b. Opening of contacts 440a insures that the circuit to motor control relays 444 and 447 previously de-energized by photoelectric switch 442 will remain open when the heating units are retracted and the photo-electric switch 442 is closed. De-energization of control relay 440 closes contacts 440b to complete a circuit through closed contacts 421b and closed contacts 444a to energize motor control relay 445 and to complete a circuit through normally closed limit switch 449 and contacts 447a to energize motor control relay 448. Energization of motor control relay 445 closes reversing contacts 445b, 445c, 445d to reverse motor M-3 to retract the heating units 130 carried by the frame 120. Energization of motor control relay 448 closes reversing contacts 448b, 448c, 448d to reverse motor M-4 to retract the heating units 130 carried by the frame 121. As the heating units 130 are retracted, limit switches 443 and 446 are released and contacts 442a and 442b of photoelectric switch 442 opened. Retraction of heating units 130 to their completely retracted position, actuates limit switches 449 and 421. Closing of contacts 440b also completes a circuit through limit switch 449 to energize solenoid 443b (Fig. 18) which shifts valve V-5 to admit pressure to fluid motor C-5 to move frame 121 of the heating means away from frame 120. Completion of the movement of the frame 121 actuates limit switch 422.

To initiate the movement of the carriage 10 to the left, a tire to be treated is first placed on the right-hand lift 19 and push button 452 is manually operated to close its contacts 452a and open its contacts 452b. Closing of contacts 452a completes a circuit through closed limit switch 453 to complete a circuit to energize solenoid 454a which shifts valve V-10 to admit pressure to fluid motor C-10 to lift the tire up into alignment with the right-hand end of the carriage 10. The solenoid 454a is deenergized when the operator releases the push button 452a.

The lift 19 continues to rise until it actuates limit switch 463. Actuation of limit switch 463, which is located in the path of movement of the lift 19, as shown in Fig. 1, completes a circuit through closed limit switch 462 to energize solenoid 461b which shifts valve V-6 to admit pressure to the fluid motor C-6 to move the right-hand clamping mechanism 12 towards the right-hand end of the carriage 10. Actuation of limit switch 463 also completes a circuit through limit switch 462 and normally closed contacts 460c of control relay 460 to complete a circuit to energize solenoid 464a to shift valve V-8 to admit pressure to the fluid motor C-8 to extend its piston rod 59. As the right-hand clamping mechanism 12 moves to the left toward the right-hand end of the carriage 10, it extends the centering pins 79, 80 and 81 and the piston rod 59 inside the tire carried by the right-hand lift 19. Further movement of the right-hand clamping mechanism toward the carriage 10 actuates limit switch 458 and releases limit switches 462 and 453. Limit switch 458 is actuated by the block 309 on the trolley 50 of the right-hand clamping mechanism 12. Actuation of limit switch 458 completes a circuit to energize solenoid 454b to shift valve V-10 to admit pressure to fluid motor C-10 to lower the right-hand tire lift 19. At this point, the tire hangs on the centering pins 79, 80 and 81. Release of limit switch 462 de-energizes solenoids 461b and 464a. As the right-hand lift 19 lowers, it releases limit switch 463.

Continued movement of the right-hand clamping mechanism 12 toward the carriage 10 actuates limit switch 467 and releases limit switch 458. Limit switch 467 is actuated by block 312 secured to the trolley 50 of the right-hand clamping mechanism 12. Release of limit switch 458 de-energizes 454b. Actuation of limit switch 467 completes a circuit to energize solenoid 466b and also completes a circuit through normally closed contacts 465b of limit switch 465 to complete a circuit to energize solenoid 464b. Energization of solenoid 446b shifts valve V-7 to admit pressure to cylinder C-7 to extend the piston rod 63 and the yoke 64 into the bore of tube 26 of the carriage 10 to engage the piston rod 59 behind the enlarged head 62 to lock it to the carriage 10. Energization of solenoid 464b shifts valve V-8 to admit pressure to fluid motor C-8 to withdraw the piston rod 59 thereof to laterally squeeze a tire between the plates 57 and 27 (Fig. 6) to distort the thread thereof and to clamp it to the right-hand end of the carriage 10.

Continued movement of the right-hand clamping mechanism 12 towards the carriage 10 actuates limit switch 427 and releases limit switch 467. Releasing limit switch 467 de-energizes solenoids 466b and 464b. Limit switch 427 is actuated by block 309 carried by the trolley 50 of the right-hand clamping mechanism 12. Actuation of limit switch 427 completes a circuit through limit switches 421a and 422 previously closed by the retraction of the heating elements 130 and the movement apart of the frames 120 and 121 to energize solenoid 426b and control relay 429. Energization of solenoid 426b shifts valve V-9 to admit pressure to fluid motor C-9 to move the carriage 10. the clamping mechanism 11 clamped to the left-hand end of the carriage 10, and the clamping mechanism 12 clamped to the right-hand end of the carriage 10 as a unit to the left to move the tire clamped to the left-hand end, out of the heating station B and to move the tire clamped to the right-hand end of the carriage 10 into the heating station B. Energization of control relay 429 closes its normally open contacts 429a (Fig. 20) to complete a circuit to energize motor control relay 468 to close the normally open contacts 468b, 468c and 468d to start rotation of motor M-2. Operation of motor M-2 rotates the clamping plates 57 and 27 and the tire clamped therebetween.

As the carriage 10 moves to the left, it actuates limit switch 432 and releases limit switch 427. Limit switch 432 is actuated by block 313 (Fig. 2) secured to the trolley 20 of the carriage 10. Release of limit switch 427 de-energizes solenoid 426b and control relay 429. Motor control relay 468 remains energized through its contacts 468a and the normally closed contacts 459b of limit switch 459. Actuation of limit switch 432 closes contacts 432a to complete a circuit to energize the clutch coil 430d of timer 430. Starting of timer 430 closes contacts 430a to complete a holding circuit for the timer and closes contacts 430b to complete a circuit to energize solenoid 431 which shifts valve V-16 which supplies water to nozzle 211 at the loading station A to cool the tread of the tire that has just been moved from the heating station B to the loading station A. Actuation of limit switch 432 also closes contacts 432b to complete a circuit to energize solenoid 433a to shift valve V-5 to admit pressure to fluid motor C-5 to move frame 121 towards frame 120 of the heating means.

As carriage 10 continues to move to the left, it actuates limit switch 404 and momentarily actuates limit switch 405 and releases limit switch 432. Limit switch 404 is actuated by block 302 on the trolley 50 of the left-hand clamping mechanism 11 and limit switch 405 is actuated by block 314 on the trolley 20 of the carriage 10. Actuation of limit switches 404 and 405 completes a circuit through normally closed contacts 401b of push button 401 to energize solenoid 403a to shift valve V-1 to admit pressure to fluid motor C-1 to raise the left-hand tire lift 18 until the stop rod 113 engages the stop block 116 (Fig. 3).

As the frame 121 completes its movement toward frame 120 of the heating means, it actuates limit switch 438 and releases limit switch 422. Actuation of limit switch 438 completes a circuit to energize clutch control coil 439c of timer 439 to start the timer. Starting of timer 439 closes contacts 439a to provide a holding circuit for the timer around the limit switch 438 and also closes contacts 439b to complete a circuit to energize control relay 440. Energization of control relay 440 closes contacts 440a and opens contacts 440b. Opening of contacts 440a completes a circuit through the contacts 442a of the photo-electric switch 442 and limit switch 443 and contacts 445a of control relay 445 to energize control relay 444. Energization of control relay 444 closes contacts 444b, 444c, 444d to start operation of motor M-3 to move the heating units 130 on the frame 120 inwardly. Closing of contacts 440a also completes a circuit through contacts 442b of photo-electric switch 442 and limit switch 446 and contacts 448a of control relay 448 to energize control relay 447. Energization of control relay 447 closes contacts 447b, 447c and 447d to start operation of motor M-4 to move heating units 130 on frame 121 inwardly. As the heating units move inwardly, the release limit switches 421 and 449. The heating units continue to move inwardly until the light beam from the light source 441 is interrupted by the tread of the tire clamped to the right-hand end of the carriage 10. Interruption of the light beam operates photo-electric switch 442 to open contacts 442a and 442b and thereby de-energize solenoids 444 and 447 to stop motor M-3 and M-4.

Timer 430 times out and opens contacts 430a and 430b and closes contacts 430c. Opening contacts 430b de-energizes solenoid 431 and valve V-16 closes to shut off its supply of cooling water to the nozzle 211 at the loading station A. Closing contacts 430c completes a circuit through limit switch 404 and contacts 409a of limit switch 409 which are momentarily closed by cam 104a on gear 65a as it rotates to energize control relay 411. Limit switch 409 is located on the left-hand clamping mechanism 11 (Fig. 1) and is actuated by cam 104a carried by the gear 64 so that it will be actuated just before the centering pin 79 reaches the uppermost position as previously described. Energization of control relay 411 closes normally open contacts 411a, 411c, and 411d and opens normally closed contacts 411b, and 411e.

Opening of contacts of 411e de-energizes motor control relay 450 when limit switch 409 is actuated when the clamping plate 57a of the left-hand clamping mechanism 11 is in the proper position. De-energization of motor control relay 450 opens contacts 450a, 450b, 450c and 450d to stop the operation of motor M-1 and therefore the rotation of the tire clamped to the carriage by the left-hand clamping mechanism 11.

Closing of contacts of 411d completes a circuit to solenoid 420a to shift valve V-3 to admit pressure to pressure cylinder C-3 to withdraw the piston rod 63a and the locking yoke 64a.

Closing of contacts 411c completes a circuit to energize solenoid 416a to shift valve V-4 to admit pressure to fluid motor C-4 to extend the piston rod 59a thereof.

Closing of contacts of 411a completes a circuit to solenoid 414a to shift valve V-2 to admit pressure to fluid motor C-2 to move the left-hand clamping mechanism 11 to the left away from the end of the carriage 10.

As the left-hand clamping mechanism 11 moves to the left away from the end of the carriage 10, the stop rod 113 is free to move upwardly and the lift 18 completes its upward movement and engages the previously heated and cooled tire. As the left-hand clamping mechanism 11 continues its movement to the left, it releases limit switch 404 which de-energizes control relay 411 which in turn de-energizes solenoids 414a, 416d and 420a.

Continued movement of the clamping mechanism 11 to the left actuates limit switches 417 and 408. Limit switch 417 is actuated by block 304 secured to trolley 50a of its left-hand clamping mechanism and limit switch 408 is actuated by block 302 secured to trolley 50a. Actuation of limit switch 417 closes normally open contacts 417a and opens normally closed contacts 417b. Closing of contacts 417a completes a circuit to energize solenoid 416b to shift valve V-4 to admit pressure to fluid motor C-4 to withdraw its piston rod 59a so that it will not interfere with the downward movement of the tire by the lift 18. Actuation of limit switch 408 completes a circuit to energize solenoid 403b to shift valve V-1 to admit pressure to the fluid motor C-1 to lower the left-hand tire lift 18 and the heat-treated tire carried thereby. The left-hand clamping mechanism 11 moves completely to the left releasing limit switch 408 and limit switch 417 and actuates limit switches 412 and 402.

Timer 439 times out to end the heating time for the tire clamped to the right-hand end of the carriage 10 and opens contacts 439a and 439b which de-energizes control relay 440. De-energizing control relay 440 opens contacts 440a and closes contacts 440b. Closing of contacts 440b completes a circuit through normally closed contacts 421a of limit switch 421 and contacts 444a of control relay 444 to energize control relay 445 to close contacts 445b, 445c and 445d to start the motor M-3 to retract the heating units 130 carried by frame 120. Closing of contacts 440b also completes a circuit through normally closed limit switch 449 and contacts 447a of control relay 447 to energize control relay 448 to close contacts 448b, 448c, and 448d, to operate motor M-4 to retract the heating units 130 on the frame 121. When the heating units 130 on the frames 120 and 121 reach their fully retracted position, they actuate normally open limit switches 421 and 449. Closing of contacts 440b also completes a circuit through limit switch 449 to energize solenoid 433b to shift the valve V-5 to admit pressure to the fluid motor C-5 to move the frame 121 away from the frame 120. When the frame 121 moves to its fully opened position, it actuates limit switch 422. At this point normally open limit switches 422, 412, 402 are closed, normally closed limit switch 449 is open, normally open contacts 421a of limit switch 421 are closed and normally closed contacts 421b are open so that the control circuit of the machine is in the same condition as it was when the machine was initially started. To start a new operating cycle, a tire is loaded on the left-hand lift 18 and the push button 401 manually operated. The machine will then go through the same cycle of operations as previously described.

It will be seen that a machine is provided for cooling and unloading a treated tire and positioning another tire for heat treatment while still another tire is being subjected to the heat treatment. In this way the time required for heat treating is used to cool a previously treated tire and position another tire for treatment. This increases the capacity of the machine inasmuch as several operations are carried out simultaneously.

Having thus described our invention, what we claim and desire to protect by Letters Patent is:

1. A machine for heat treating tires comprising, a carriage movable between a loading station and a heating station, means for laterally squeezing the tire to distort the tread thereof and to clamp the tire to the carriage, means at the heating station for heating the tread of the tire and means for applying a protective liquid coating to the tread during the heating.

2. A machine for heat treating tires comprising, a carriage movable between a loading station and a heating station, means for laterally squeezing the tire to distort the tread thereof and to clamp the tire to the carriage, means at the heating station for heating the tread of the tire, means for applying a protective coating to the tread of the tire during the heating and means at the loading station for cooling the tread of the tire after the heating.

3. A machine for heat treating tires comprising, a carriage movable between a loading station and a heating station, means for moving a tire into alignment with the carriage, means for simultaneously laterally squeezing the tire to distort the tread thereof and to clamp the tire for rotary movement to the carriage, means for rotating the tire, means at the heating station for heating the tread of the tire during rotation thereof, means for applying a protective liquid coating to the tread during heating and means for cooling the tire after heating.

4. A machine for heat treating tires comprising, a carriage movable between a loading station and a heating station, means for simultaneously laterally squeezing the tire to distort the tread thereof and clamp the tire for rotary motion to the carriage, means for rotating the clamped tire, means at the heating station for heating the tread of the tire, and means for applying a protective coating to the tire tread during heating.

5. In a machine for heat treating tires, the combination comprising, a movable carriage, a flat circular plate rotatably mounted on one end of the carriage, a second movable carriage, a second circular plate rotatably mounted on said second carriage, a fluid pressure cylinder carried by said second carriage, a piston in said cylinder, a plunger carried by said piston extending through the axis of rotation of said second plate, locking means carried by said first named carriage for locking the plunger thereto, means for applying fluid pressure to said cylinder to withdraw the plunger and thereby move the carriages and plates together to clamp a tire therebetween and means for rotating the plates and clamped tire.

6. In a machine for heat treating tires, the combination comprising, a movable carriage, a flat circular plate rotatably mounted on one end of the carriage, a second movable carriage, a second flat circular plate rotatably mounted on said second movable carriage, centering pins carried by one of said plates for centering a tire relative to the axis of rotation of the plates, a fluid pressure cylinder carried by the second carriage, a piston in the cylinder, a plunger attached to the piston and extending through the axis of rotation of the second plate, locking means carried by the first named carriage for locking the plunger thereto, means for applying fluid pressure to said cylinder to withdraw the plunger and thereby move the carriage and plates together to clamp a tire therebetween and means for rotating the plates and clamped tire.

7. In a machine for heat treating tires, a support for a tire, a pair of opposed frames disposed one on each side of the support, heating elements carried by the frames and surrounding the support, means for simultaneously radially moving the heating elements towards and away from the support, control means including photo-electric means carried by one of the heating elements for controlling the radial movement of the heating elements whereby the heating elements will be spaced from the tread of the tire a predetermined distance.

8. A machine for heat treating tires comprising a carriage alternately movable between a first loading station and a second loading station, means for simultaneously laterally squeezing a tire to distort the tread and to clamp a tire to each end of the carriage, means at each loading station for moving a tire into alignment with the carriage, and heating means positioned intermediate of the first and second loading stations and surrounding the path of movement of the carriage to heat the tread of the tire carried by the carriage.

9. A machine for heat treating tires comprising, a carriage alternately movable between a first loading station and a second loading station, means for simultaneously laterally squeezing a tire to distort the tread and to clamp it to one end of the carriage, means for simultaneously laterally squeezing another tire to distort the tread and clamp it to the other end of the carriage, heating means positioned at a point intermediate of the loading stations and surrounding the path of movement of the carriage, the carriage being of such a length that one end thereof is at a loading station when the other end is at the heating means whereby one tire may be unloaded and a second tire loaded and clamped to the carriage while a third tire is being heated.

10. A machine for heat treating tires comprising, a carriage alternately movable between a first loading station and a second loading station, means at each end of the carriage for laterally squeezing a tire to distort the tread and to clamp it to the carriage, heating means positioned at a point intermediate of the loading stations and surrounding the path of movement of the carriage to heat the tread of the tire, means for applying a coating of protective liquid to the tires during the heating, the carriage being of such a length that one end is at one of the loading stations when the other end is at the heating means whereby one tire may be removed from one end of the carriage and a second tire clamped to the same end of the carriage while a third tire clamped to the other end is being heated.

11. A machine for heat treating tires comprising, a carriage alternately movable between a first loading station and a second loading station, means at each end of the carriage for laterally squeezing the tire to distort the tread thereof and clamp it to the carriage, heating means positioned at a point intermediate of the loading stations, and surrounding the path of movement of the carriage, means at each loading station for cooling the tire after the heating, the carriage being of such a length that one end of the carriage is at one of the loading stations when the other end is at the heating means whereby one tire may be cooled by the cooling means and removed from one end of the carriage and replaced by a second tire while a third tire clamped to the other end of the carriage is being heated.

12. A machine for heat treating tires comprising, a carriage alternately movable between a first loading station and a second loading station, means at each end of the carriage for laterally squeezing the tire to distort the tread thereof and clamp it to the carriage, heating means positioned at a point intermediate of said loading stations, and surrounding the path of movement of said carriage for heating the tread of a tire clamped to said carriage, means for applying a protective coating of liquid to the tread of the tire during heating, cooling means at each loading station for cooling the tire after heating thereof, the carriage being of such a length that one end thereof is at one of the loading stations when the other end is at the heating means whereby one tire may be cooled by the cooling means and removed from one end of the carriage and replaced by a second tire while a third tire clamped to the other end is being heated.

13. A machine for heat treating tires comprising, a carriage alternately movable between a first loading station and a second loading station, means at each end of the carriage for laterally squeezing a tire to distort the tread thereof and to clamp the tire to the end of the carriage, means at each loading station for moving a tire into alignment with the carriage so that it may be clamped to the carriage, heating means positioned at a point intermediate of the loading station and surrounding the path of movement of said carriage for heating the tread of a tire clamped to the end of the carriage, means for applying a protective coating of liquid to the tread of the tire during heating, means at each loading station for cooling the tire after heating, the carriage being of such length that when one end thereof is at the loading station, the other end is at the heating means whereby one tire may be cooled and removed from one end of the carriage and replaced by a second tire while a third tire clamped to the other end of the carriage is being heated.

14. A machine for heat treating tires comprising, a carriage alternately movable between a first loading station and a second loading station, means at each end of the carriage for laterally squeezing a tire to distort the tread thereof and to calmp it to the end of the carriage, means at each loading station for moving a tire into alignment with the end of said carriage so that it may be clamped thereto, heating means positioned at a point intermediate of said loading stations and surrounding the path of movement of the carriage to heat the tread of the tire clamped thereto, the carriage being of such a length that when one end is at one of the loading stations the other end will be at the heating means whereby one tire may be removed from one end of carriage and replaced by a second tire while a third tire clamped to the other end of the carriage is being heated.

15. A machine for heat treating tires comprising, a carriage alternately movable between a first loading station and a second loading station, means at each end of the carriage for laterally squeezing a tire to distort the tread thereof and to clamp the tire for rotary movement to the carriage, means for rotating the clamped tire, heating means positioned at a point intermediate to said loading stations and surrounding the path of movement of the carriage to heat the tread of a tire clamped to the carriage, the carriage being of such a length that one end thereof is at one loading station when the other end is at the heating means whereby one tire may be removed from one end of the carriage and replaced by a second tire while a third tire clamped to the other end of the carriage is being heated.

16. In a machine for heat treating tires, the combination comprising, a track, a carriage mounted for movement along said track, a clamping plate rotatably mounted on each end of the carriage, means for independently rotating each plate, a second carriage mounted for movement along said track, a plate rotatably mounted on said second carriage and opposing one of said clamping plates on said first mentioned carriage, a third carriage mounted for movement along said track, clamping plate rotatably mounted on said third carriage and opposing the other of said clamping plates on said first mentioned carriage, means for independently moving the second and third carriages relative to said first mentioned carriage to clamp a tire between the opposing clamping plates, means for rotating the clamping plates of the second and third carriages at the same speed as the opposing clamping plates on the first mentioned carriage, and means for moving all the carriages as a unit along the track.

17. In a machine for heat treating tires, the combination comprising, a track, a carriage mounted for movement along said track, a flat circular clamping plate rotatably mounted at each end of the carriage, means for independently rotating each of such clamping plates, a second carriage mounted for movement along said track, a flat circular clamping plate rotatably mounted on said second carriage and opposing one of said clamping plates on said first mentioned carriage, a third carriage mounted for movement along said track, a flat circular clamping plate rotatably mounted on said third carriage and opposing the other of said clamping plates on said first mentioned carriage, means for independently moving the second and third carriages relative to said first mentioned carriage to clamp a tire between the opposing clamping plates, centering pins carried by the clamping plates to center the tire relative to the axis of rotation of the plates, means for rotating the clamping plates, and means for moving all the carriages as a unit along the track.

18. In a machine for heat treating tires, a support for a tire, a pair of opposed frames disposed one on each side of the support, heating units carried by the frames and surrounding the support, an applicator roll for applying a liquid coating to the tread surface of the tire carried by one of said frames, means for simultaneously radially moving the heating units and the applicator roll toward and away from the support and means for moving one frame relative to the other.

19. A machine for heat treating tires comprising, a carriage movable between a first loading station and a second loading station, a first means for laterally squeezing a tire to distort the tread thereof and to clamp it to one end of the carriage, second means for laterally squeezing a tire to distort the tread thereof and clamp it to the other end of the carriage, a pair of opposed frames disposed on either side of the path of movement of the carriage at a point intermediate of said loading stations, heating units carried by said frames and surrounding the path of movement of the carriage, means for alternately moving the carriage from one loading station to the other, means for moving one frame relative to the other to permit the passage of the carriage therethrough, the carriage being of such a length that one end thereof is surrounded by said heating units when the other end is at one of said loading stations whereby one tire may be unloaded from the end of the carriage at the loading station and replaced by a second tire while a third tire clamped to the other end is being heated and means for simultaneously radially moving said heating units towards and away from said third tire clamped to said other end.

20. A machine for heat treating tires comprising, a carriage movable between a first loading station and a second loading station, first means for laterally squeezing a tire to distort the tread thereof and to clamp it for rotation to one end of the carriage, second means for laterally squeezing a tire to distort the tread thereof and clamp it for rotation to the other end of the carriage, means for independently rotating each tire clamped to each end of the carriage, a pair of opposed frames disposed on each side of the path of movement of the carriage at a point intermediate of said loading stations, heating units carried by said frame and surrounding said path of movement, means for alternately moving the carriage from one loading station to the other, means for moving one frame relative to the other frame to permit passage of the carriage therebetween, the carriage being of such a length that one end thereof is surrounded by said heating units when the other end is at one of said loading stations whereby one tire may be unloaded from said end of the carriage at the loading station and replaced by a second tire while a third tire clamped to the other end is being heated, and means for simultaneously radially moving said heating units towards and away from said third tire clamped to said other end.

21. A machine for heat treating tires comprising, a carriage movable between a first loading station and a second loading station, means at each loading station for moving a tire into alignment with an end of said carriage, first means for laterally squeezing a tire to distort the tread thereof and clamp it for rotation to one end of the carriage, second means for laterally squeezing a tire to distort the tread thereof and clamp it for rotation to the other end of the carriage, means for independently rotating each tire clamped to each end of the carriage, a pair of opposed frames disposed on either side of the path of movement of the carriage at a point intermediate to said loading stations, heating units carried by said frame and surrounding said path of movement, means for alternately moving the carriage from one loading station to the other, means for moving one frame relative to the other frame to allow passage of the carriage therebetween, the carriage being of such a length that one end thereof is surrounded by said heating units when the other end is at one of said loading stations whereby a tire may be unloaded from said end of the carriage at the loading station and replaced by a second tire while a third tire clamped to the other end is being heated, and means for simultaneously radially moving said heating units towards and away from said third tire clamped to said other end.

22. A machine for heat treating tires comprising, a carriage movable between a first loading station and a second loading station, means for laterally squeezing a tire to distort the tread thereof and clamp it for rotation to each end of the carriage, means for independently rotating each tire clamped to each end of the carriage, a pair of opposed frames disposed on either side of the path of movement of the carriage at a point intermediate of said loading stations, heating units carried by said frames and surrounding said path of movement, an applicator roll carried by one of said frames for applying a coating of protective liquid to the tread surface of a tire carried by said carriage, means for alternately moving the carriage from one loading station to the other, means for moving the frames toward and away from each other to allow passage of the carriage therebetween, the carriage being of such a length that one end thereof is surrounded by said heating elements and the other end is at one of said loading stations whereby one tire may be unloaded from said end of the carriage at the loading station and replaced by a second tire while a third tire clamped to the other end is being heated, and means for simultaneously radially moving said heating units and said applicator roll towards and away from said third tire clamped to said other end.

23. In a machine for heat-treating tires, the combination comprising, a movable carriage, a plate mounted on one end of the carriage, a second movable carriage, a second plate mounted on said second carriage, an extensible and retractable plunger carried by one of said carriages, locking means carried by the other of said carriaages for locking the plunger thereto, and means for retracting said plunger to thereby move the carriages and plates together to clamp a tire therebetween.

GEORGE F. WIKLE.
CHARLES E. TODD.

References Cited in the file of this patent

UNITED STATES PATENTS

| Number | Name | Date |
|---|---|---|
| 998,221 | Wheeler | July 18, 1911 |
| 1,318,383 | Hermsdorf | Oct. 14, 1919 |
| 1,407,193 | Diescher | Feb. 21, 1922 |
| 1,586,943 | Brown | June 1, 1926 |
| 1,706,874 | De Journo | Mar. 26, 1929 |
| 1,744,753 | Denmire | Jan. 28, 1930 |
| 2,094,511 | Welch | Sept. 28, 1937 |
| 2,193,119 | Bailey | Mar. 12, 1940 |
| 2,198,638 | Standish | Apr. 30, 1940 |
| 2,202,758 | Denneen et al. | May 28, 1940 |
| 2,238,534 | McDonald | Apr. 15, 1941 |
| 2,263,866 | Barber | Nov. 25, 1941 |
| 2,265,346 | Brown et al. | Dec. 9, 1941 |
| 2,314,726 | Moore et al. | Mar. 23, 1943 |
| 2,357,930 | Clark | Sept. 12, 1944 |
| 2,417,102 | Campbell | Mar. 11, 1947 |
| 2,497,676 | Lashells | Feb. 14, 1950 |
| 2,546,085 | Briscoe et al. | Mar. 20, 1951 |